US008379248B2

(12) United States Patent
Kurahashi

(10) Patent No.: US 8,379,248 B2
(45) Date of Patent: Feb. 19, 2013

(54) IMAGE-FORMING APPARATUS AND INFORMATION-PROCESSING METHOD

(75) Inventor: Yuichi Kurahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 6826 days.

(21) Appl. No.: 12/204,108

(22) Filed: Sep. 4, 2008

(65) Prior Publication Data

US 2009/0059290 A1 Mar. 5, 2009

(30) Foreign Application Priority Data

Sep. 4, 2007 (JP) ................................ 2007-229393

(51) Int. Cl.
*G06F 3/12* (2006.01)

(52) U.S. Cl. ...................................... 358/1.15; 358/504

(58) Field of Classification Search ........................ None
See application file for complete search history.

(56) References Cited

U.S. PATENT DOCUMENTS

| | | | | |
|---|---|---|---|---|
| 5,893,005 | A | 4/1999 | Ogura | |
| 2007/0028061 | A1 * | 2/2007 | Takehana et al. | 711/156 |

FOREIGN PATENT DOCUMENTS

| | | | |
|---|---|---|---|
| EP | 768582 | A1 | 4/1997 |
| JP | 08-152826 | A | 6/1996 |
| JP | 8-152826 | A | 6/1996 |
| JP | 08-331355 | A | 12/1996 |
| JP | 9-6192 | A | 1/1997 |
| JP | 2003-115968 | A | 4/2003 |
| JP | 2006-99281 | A | 4/2006 |
| JP | 2006-099281 | A | 4/2006 |

OTHER PUBLICATIONS

Translation of Japanese Application JP 09-006192.*

* cited by examiner

*Primary Examiner* — Marivelisse Santiago Cordero
*Assistant Examiner* — Lennin Rodriguez
(74) *Attorney, Agent, or Firm* — Canon USA Inc IP Division

(57) ABSTRACT

An image-forming apparatus includes a reception unit configured to receive a start instruction and an end instruction entered by a service engineer who performs a maintenance work for the image-forming apparatus. A first holding unit is configured to store first counter information obtained by the image-forming apparatus in a case that the reception unit receives the start instruction. A second holding unit is configured to store second counter information obtained by the image-forming apparatus in a case that an operating state of the image-forming apparatus satisfies a first end condition. A generation unit is configured to generate maintenance information based on the second counter information stored in the second holding unit if the operating state of the image-forming apparatus satisfies the first end condition and further satisfies a second end condition before the reception unit receives the end instruction from the service engineer.

14 Claims, 13 Drawing Sheets

FIG.5

400

401 402 403 404

| HISTORY | TYPE OF INFORMATION | START/END OF MAINTENANCE | COUNTER INFORMATION |
|---|---|---|---|
| 26 | 1. START | 2006/04/01 10:25 | 18600 |
| 27 | 2. END | 2006/04/01 10:36 | 18602 |
| 28 | 1. START | 2006/05/05 15:10 | 20510 |
| 29 | 3. PROVISIONAL END | 2006/05/05 15:40 | 20515 |
| 30 | 1. START | 2006/06/20 08:30 | 24100 |
| 31 | 2. END | 2006/06/20 08:48 | 24102 |
| 32 | 1. START | 2006/08/08 17:15 | 27000 |
| 33 | 3. PROVISIONAL END | 2006/08/08 17:45 | 27003 |
| 34 | 2. END | 2006/08/08 18:02 | 27008 |
| ⋮ | ⋮ | ⋮ | ⋮ |

FIG.7

500

| HISTORY (501) | START/END OF MAINTENANCE (502) | COUNTER VALUE AT START (503) | WORK TIME (504) | COUNT DURING WORK (505) | PROVISIONAL FLAG (506) |
|---|---|---|---|---|---|
| 12 | 2006/04/01 10:25 | 18600 | 11 | 2 | 0 |
| 13 | 2006/05/05 15:10 | 20510 | 30 | 5 | 1 |
| 14 | 2006/06/20 08:30 | 24100 | 18 | 2 | 0 |
| 15 | 2006/08/08 17:15 | 27000 | 47 | 8 | 0 |
| 16 | 2006/10/10 11:40 | 32260 | 13 | 3 | 0 |
| 17 | 2006/10/31 18:10 | 34300 | 30 | 2 | 1 |
| ... | ... | ... | ... | ... | ... |

FIG.13

FD/CD-ROM OR RECORDING MEDIUM

| |
|---|
| DIRECTORY INFORMATION |
| PROGRAM CODE CORRESPONDING TO STEPS OF FLOWCHART ILLUSTRATED IN FIG. 6 |
| PROGRAM CODE CORRESPONDING TO STEPS OF FLOWCHART ILLUSTRATED IN FIG. 9 |
| PROGRAM CODE CORRESPONDING TO STEPS OF FLOWCHART ILLUSTRATED IN FIG. 12 |

FIG.14

FD/CD-ROM OR RECORDING MEDIUM

| |
|---|
| DIRECTORY INFORMATION |
| PROGRAM CODE CORRESPONDING TO STEPS OF FLOWCHART ILLUSTRATED IN FIG. 8 |
| PROGRAM CODE CORRESPONDING TO STEPS OF FLOWCHART ILLUSTRATED IN FIG. 10 |

IMAGE-FORMING APPARATUS AND INFORMATION-PROCESSING METHOD

BACKGROUND OF THE INVENTION

1. Field of the Invention

The present invention relates to an image-forming apparatus that performs maintenance processing.

2. Description of the Related Art

A monitoring system, operable by a remote user, monitors an operating state of an image-forming apparatus, such as a copying machine or a printer, connected to a local area network (LAN). The system includes a plurality of image-forming apparatuses and a monitoring apparatus that can communicate with each other via a LAN, a wide area network (WAN), or the Internet.

Each image-forming apparatus periodically transmits counter information, such as the number of times of image formation made, to the monitoring apparatus. Furthermore, the image-forming apparatus notifies the monitoring apparatus of the occurrence of jam or error. The information received by the monitoring apparatus is managed as maintenance information.

The monitoring apparatus, functioning as an information storage/management apparatus, determines an operating status of each image-forming apparatus based on the content of information received from the image-forming apparatus. The monitoring apparatus manages accounting for a client according to the maintenance contract, based on the information received, and dispatches a service engineer for a maintenance work if necessary.

For example, the maintenance contract for an image-forming apparatus includes determining the amount of charge based on the total number of times of image formation made per month. In such a case, the monitoring apparatus calculates the sum of image formation made per month based on counter information periodically transmitted from each image-forming apparatus and determines the amount of money to be charged.

To manage the status of image formation, the counter is configured to count the number of times of image formation actually made by an image-forming apparatus. Therefore, the counter number includes the number of times of image formation performed by a service engineer for the maintenance work.

The number of times of image formation calculated by the monitoring apparatus based on counter information becomes larger than the number of times of image formation actually made by a client. The amount of money charged for the client according to the maintenance contract increases unreasonably.

When a service engineer can manually record the number of times of image formation made during the maintenance work, a recorded number can be subtracted from the counter number corresponding to the amount of money charged on a bill to be issued.

However, according to the above-described recording method, a service engineer is required to manually perform recording and processing for determining the amount of charge. Furthermore, the manual operation-dependent method is not reliable.

To solve the above-described problem, a system discussed in Japanese Patent Application Laid-Open No. 8-152826 includes an instruction unit provided in an image-forming apparatus. The instruction unit enables a user to instruct start/end of the maintenance work, and the image-forming apparatus records the number of times of image formation made during the maintenance work.

Then, according to the system discussed in Japanese Patent Application Laid-Open No. 8-152826, an image-forming apparatus transmits the amount of image formation made during a maintenance work to a management apparatus. The management apparatus calculates the amount of money charged based on the information received from the image-forming apparatus.

The management apparatus can reduce a burden placed on a service engineer during a maintenance work, namely, does not require the service engineer to manually record the number of times of image formation made during the maintenance work. The management apparatus identifies the number of times of image formation actually made by a user, and can determine the amount of money charged corresponding to the identified number of times of image formation made.

The maintenance contract can include an agreement that guarantees a predetermined time/ratio corresponding to normal operation time (uptime) that does not include a maintenance work for an image-forming apparatus or a failed state of the image-forming apparatus.

In such a case, to calculate the uptime, the system is required to measure the start time and the end time of each maintenance work.

A system discussed in Japanese Patent Application Laid-Open No. 2006-99281 includes a time authentication unit configured to record start/end instruction time of a maintenance work.

These systems require a work start operation and a work end operation performed by a service engineer. To prevent the service engineer from forgetting the required operations, the system discussed in Japanese Patent Application Laid-Open No. 9-6192 includes a display unit that displays a current status of the maintenance work.

As described above, the service engineer is required to perform manual operations for a system that manages the amount of image formation made during a maintenance work and calculates the amount of money to be charged for a client or a system that manages the time required for a maintenance work. However, the service engineer may fail to perform required operations.

In general, a service engineer starts a maintenance work while viewing an operation menu for the maintenance work, which ensures the service engineer to enter a maintenance start instruction.

On the other hand, the service engineer tends to forget a maintenance end operation because the service engineer can immediately leave the client's facility upon finishing the maintenance work.

Furthermore, as understood from the conventional system that includes a work end operation unit manually operable by a service engineer, it is generally difficult to accurately detect the end time of a maintenance work based on an operating status without relying on manual operations.

Furthermore, if a service engineer does not perform a maintenance work end operation, the system is continuously kept in an inoperative state where every image formation is regarded as formation made for the maintenance work, even after the service engineer has finished the maintenance work, and all the image formation is not counted for the accounting processing.

To solve this problem, a system discussed in Japanese Patent Application Laid-Open No. 9-6192 displays a message of maintenance work currently performed on its display unit to prevent a service engineer from failing to perform a maintenance work end operation.

However, the service engineer possibly fails to confirm the display of maintenance, if the service engineer forgets a maintenance work end operation and immediately leaves the client's facility upon finishing the maintenance work.

SUMMARY OF THE INVENTION

Exemplary embodiments of the present invention are directed to a system capable of accurately performing accounting processing for an image-forming apparatus even when a service engineer fails to enter an end instruction when a maintenance work for the image-forming apparatus is finished.

According to an aspect of the present invention, an image-forming apparatus includes a reception unit configured to receive a start instruction and an end instruction entered by a service engineer who performs a maintenance work for the image-forming apparatus, a first holding unit configured to store first counter information obtained by the image-forming apparatus in a case that the reception unit receives the start instruction, a second holding unit configured to store second counter information obtained by the image-forming apparatus in a case that an operating state of the image-forming apparatus satisfies a first end condition, and a generation unit configured to generate maintenance information based on the second counter information stored in the second holding unit if the operating state of the image-forming apparatus satisfies the first end condition and further satisfies a second end condition before the reception unit receives the end instruction from the service engineer.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 5 illustrates an example maintenance history table stored in a storage device of the monitoring apparatus illustrated in FIG. 1.

FIG. 7 illustrates another maintenance history table stored in the storage device of the monitoring apparatus illustrated in FIG. 1.

FIG. 13 illustrates an example memory map of a storage medium that stores various data processing programs readable by an image-forming apparatus according to an exemplary embodiment of the present invention.

FIG. 14 illustrates an example memory map of a storage medium that stores various data processing programs readable by an information-processing apparatus according to an exemplary embodiment of the present invention.

DETAILED DESCRIPTION OF THE EMBODIMENTS

Figure 1:
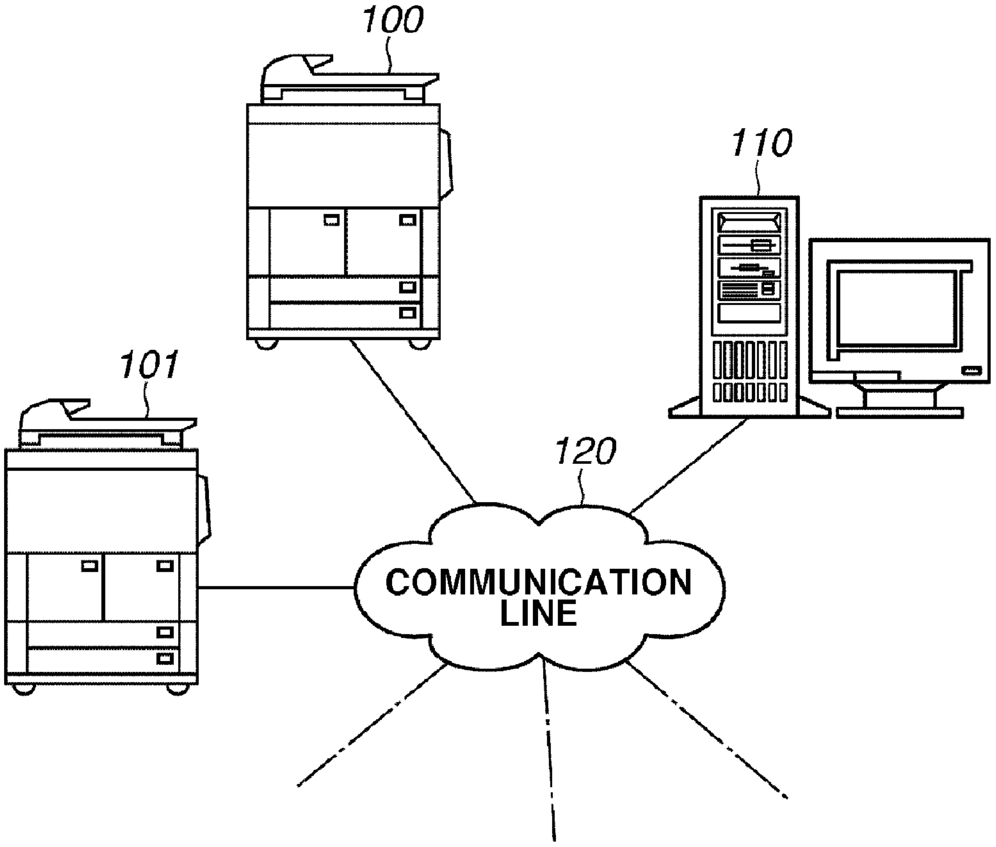
FIG. 1 illustrates an example image-processing system that includes at least one image-forming apparatus according to a first exemplary embodiment of the present invention.

The following description of exemplary embodiments is illustrative in nature and is in no way intended to limit the invention, its application, or uses. Processes, techniques, apparatus, and systems as known by one of ordinary skill in the art are intended to be part of the enabling description where appropriate. It is noted that throughout the specification, similar reference numerals and letters refer to similar items in the following figures, and thus once an item is described in one figure, it may not be discussed for following figures. Exemplary embodiments will be described in detail below with reference to the drawings.

First Exemplary Embodiment

FIG. 1 illustrates an example image-processing system that includes an image-forming apparatus according to a first exemplary embodiment of the present invention. The image-processing system includes a monitoring apparatus and a plurality of image-forming apparatuses, which can communicate with each other via a communication line. The number of image-forming apparatuses connected to the monitoring apparatus is not limited to two.

Although not illustrated in FIG. 1, the image-forming apparatus includes a plurality of devices that require a maintenance work by a service engineer.

The devices to be maintained by a service engineer include photosensitive drums that perform image forming processing, development units, charging units, fixing units, clutches, and controllers.

The image-forming apparatus is connectable with optional units (not illustrated), which also require a maintenance work by a service engineer.

In FIG. 1, an image-forming apparatus 100 can communicate with a monitoring apparatus 110 via a communication line 120. The communication line 120 is, for example, a local area network (LAN), a wide area network (WAN), or the Internet. The communication line 120 can be a wired type or a wireless type.

The monitoring apparatus 110 can be a local monitoring apparatus located in a client's facility or a central server connected to the Internet.

According to an exemplary embodiment, the monitoring apparatus 110 monitors two image-forming apparatuses 100 and 101, although three or more image-forming apparatuses can be monitored by the monitoring apparatus 110.

Figure 2:
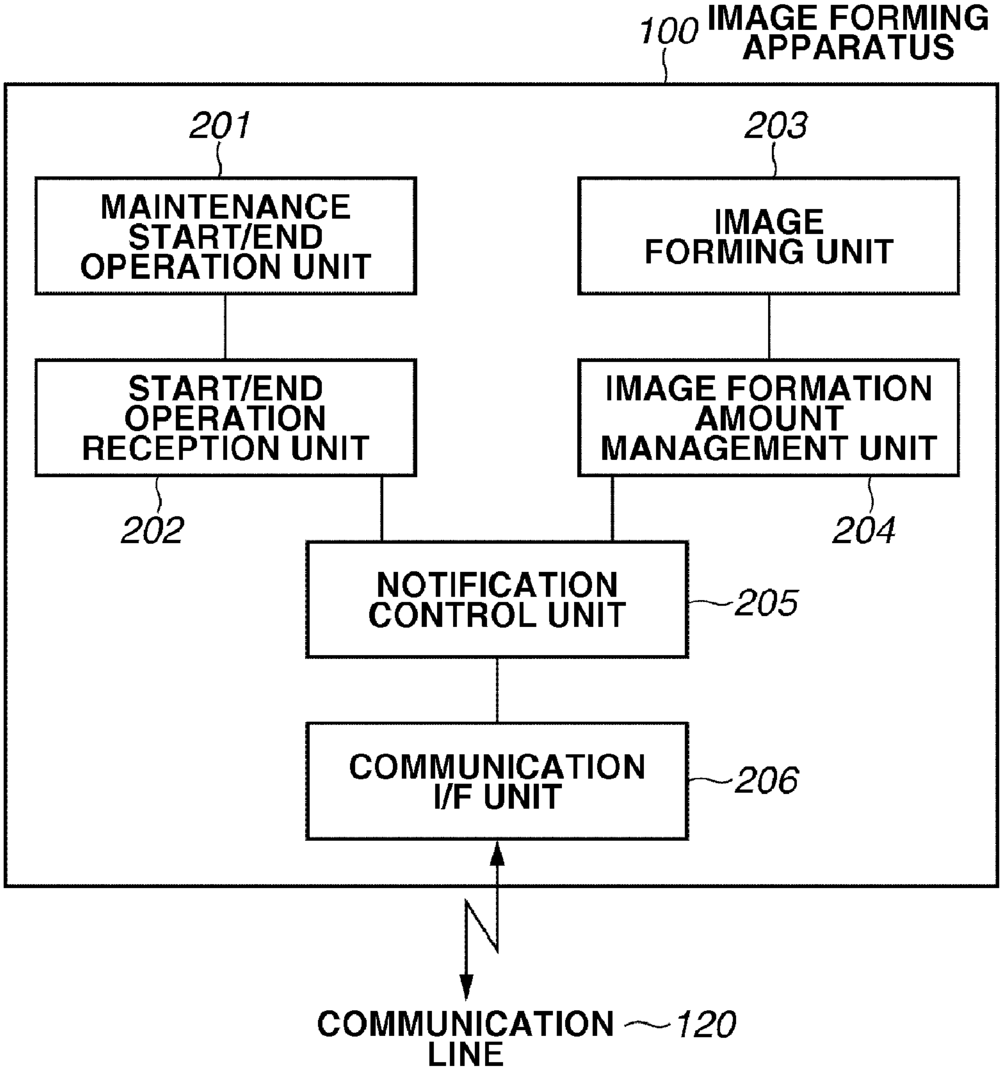
FIG. 2 is a block diagram illustrating an example configuration of the image-forming apparatus illustrated in FIG. 1.

FIG. 2 is a block diagram illustrating an example configuration of the image-forming apparatus 100 illustrated in FIG. 1. The image-forming apparatus 101 has a configuration similar to that of the image-forming apparatus 100.

In FIG. 2, a maintenance start/end operation unit 201 includes an input device equipped with various keys and a touch panel. The maintenance start/end operation unit 201 accepts start/end instructions of a maintenance work entered by a service engineer who operates the input device.

A start/end operation reception unit 202 receives start/end instructions of a maintenance work accepted by the maintenance start/end operation unit 201, and notifies the reception of the start/end instructions to a notification control unit 205.

An image-forming unit 203 is, for example, a printer, a scanner, or a facsimile.

An image formation amount management unit 204 includes a counter that counts the number of times of image formation performed by the image-forming unit 203. The image formation amount management unit 204 stores a count value (counter information) in a nonvolatile memory.

In an exemplary embodiment, the image formation amount management unit 204 includes a memory that can function as a first holding unit configured to store first counter information, a second holding unit configured to store second counter information, and a third holding unit configured to store third counter information.

The notification control unit 205 acquires counter information (a count value obtained by the counter) from the image formation amount management unit 204 in response to start/end instructions of a maintenance work from the start/end operation reception unit 202. The notification control unit 205 transmits maintenance information to the monitoring apparatus 110 via a communication interface (I/F) unit 206. The maintenance information includes counter information acquired from the image formation amount management unit 204.

The communication I/F unit 206 operates as a network interface, which transmits maintenance information including counter information to the monitoring apparatus 110 via the communication line 120.

Furthermore, the notification control unit 205 determines a provisional end of the maintenance work based on an end condition (e.g., elapsed time after reception of a maintenance start instruction).

In the provisional end determination according to an exemplary embodiment, assuming that a service engineer may fail to enter an end instruction of the maintenance work, the image formation amount management unit 204 sets a time that can be regarded as a provisional end of the maintenance work, and acquires counter information and stores the acquired information in the memory.

Figure 3:
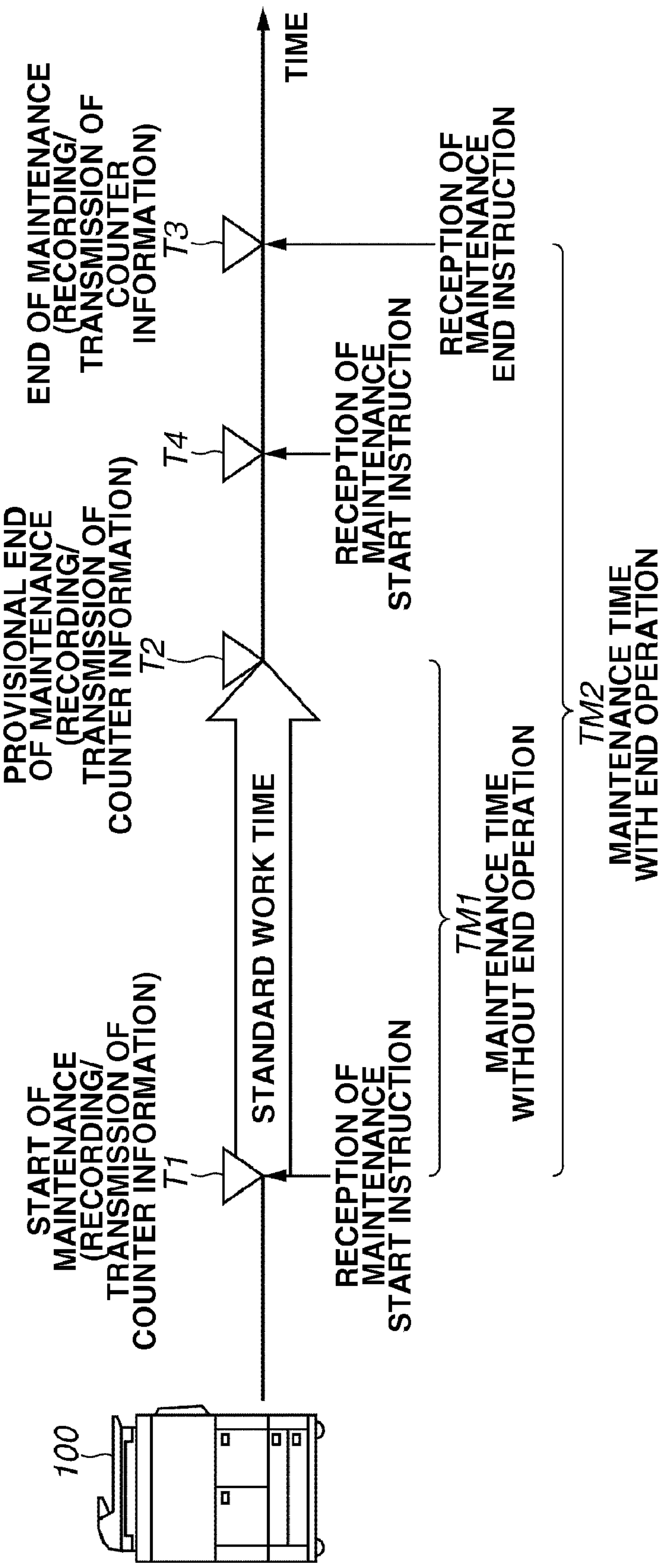
FIG. 3 is a timing diagram illustrating the status of a maintenance work performed by the image-forming apparatus illustrated in FIG. 1.

FIG. 3 is a timing diagram illustrating the status of a maintenance work for the image-forming apparatus 100 illustrated in FIG. 1.

In FIG. 3, the start/end operation reception unit 202 receives a maintenance start instruction instructed by a service engineer from the maintenance start/end operation unit 201 at time T1. In an exemplary embodiment, counter information held by the image formation amount management unit 204 at time T1 is referred to as first counter information.

Time T2 is a time being set as a provisional end of the maintenance work, which can be set appropriately considering the time required for the maintenance work (e.g., 30 minutes). In other words, a provisional end time can be set considering the possibility that the service engineer may fail to instruct the end of the maintenance via the maintenance start/end operation unit 201. According to an exemplary embodiment, a "first end condition" is satisfied when a predetermined time has elapsed after a start instruction of the maintenance work entered by a service engineer.

The image formation amount management unit 204 stores, in a memory, counter information obtained by a counter when the first end condition is satisfied. The stored counter information is referred to as second counter information.

After time T2, the start/end operation reception unit 202 receives a maintenance end instruction from the service engineer via the maintenance start/end operation unit 201 at time T3. More specifically, according to the example illustrated in FIG. 3, after time T2 that defines the provisional end of the maintenance work, a service engineer manually enters a maintenance end instruction.

At time T3, the image formation amount management unit 204 deletes the counter information held in the memory at time T2 and, then, stores counter information obtained by the counter at this moment (time T3) in the memory.

Thus, after the counter information is once held at time T2 assuming that the service engineer fails to enter a maintenance end instruction, the number of times of image formation performed by the service engineer until an actual input of the maintenance end instruction can be stored as normal maintenance information in the memory.

Time T4, namely after time T2 and before time T3, is the time the service engineer again enters a maintenance start instruction. More specifically, the service engineer forgets to enter a maintenance end instruction for a while after time T2, which defines the provisional end. Then, the service engineer again enters a maintenance start instruction at time T4. The situation possibly occurs if the service engineer fails to enter a maintenance end instruction after the service engineer enters a maintenance start instruction at time T1.

According to an exemplary embodiment, when a set time has elapsed after a service engineer enters a maintenance start instruction, the service engineer again enters a maintenance start instruction before the service engineer enters a maintenance end instruction. This is referred to as a "second end condition."

In this case, the notification control unit 205 generates maintenance information to be transmitted to the monitoring apparatus 110 based on the counter information stored in the memory of the image formation amount management unit 204 at time T2.

The image formation amount management unit 204 stores, in its nonvolatile memory, counter information of the counter that counts the number of times of image formation made at times T1, T2, T3, and T4. The notification control unit 205 transmits, to the monitoring apparatus 110, maintenance information generated based on the counter information stored in the memory of the image formation amount management unit 204.

The second counter information stored by the image formation amount management unit 204 at time T2 includes counter information that represents a difference between the second counter information and the first counter information held by the image formation amount management unit 204 at time T1.

More specifically, according to a system that counts up the number of times of image formation made, the count value increases continuously without being reset to “0” at time T1. Therefore, if the image formation amount management unit 204 counts up the number “n” of image formation made for the maintenance, the counter information held by the notification control unit 205 at this moment is equal to “X+n” when the first counter information is “X.” Hence, the notification control unit 205 transmits counter information indicating a difference (=n) between the first counter information and the second counter information to the monitoring apparatus 110.

According to an exemplary embodiment, the notification control unit 205 can be configured to transmit the first and second counter information stored in the memory of the image formation amount management unit 204 at times T1 and T2 to the monitoring apparatus 110. In this case, the monitoring apparatus 110 calculates the substantial number of times of image formation performed for the maintenance work by subtracting the first counter information from the second counter information.

In FIG. 3, TM1 represents a provisional maintenance time, which is equal to a difference between time T2 and time T1. TM2 represents a maintenance time based on an end operation, which is equal to a difference between time T3 and time T1.

If the monitoring apparatus 110 receives a maintenance end instruction after time T2 defining the provisional end, the monitoring apparatus 110 determines a duration between reception of the maintenance start instruction and reception of the maintenance end instruction as a maintenance work time (i.e., maintenance time TM2 based on an end operation).

If the monitoring apparatus 110 does not receive any maintenance end instruction after time T2 that defines the provisional end, the monitoring apparatus 110 determines a duration between reception of the maintenance start instruction and the provisional end as a maintenance work time (i.e., provisional maintenance time TM1).

Figure 4:
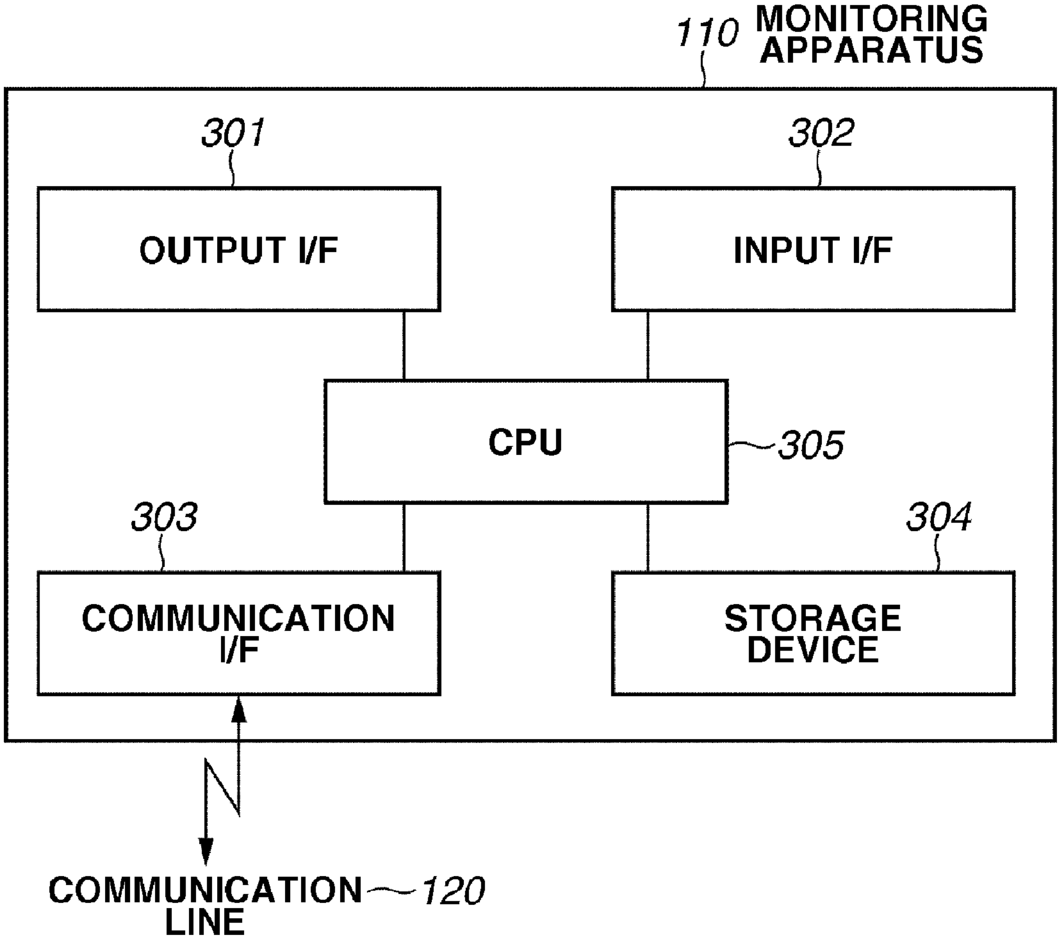
FIG. 4 is a block diagram illustrating an example configuration of a monitoring apparatus illustrated in FIG. 1.

FIG. 4 is a block diagram illustrating an example configuration of the monitoring apparatus 110 illustrated in FIG. 1.

The monitoring apparatus 110 includes an output I/F 301 connected to a display device that displays image/text data and an input I/F 302 connected to an input device, such as a keyboard or a pointing device.

A communication I/F 303, connected to the communication line 120, performs communication with the image-forming apparatus 100. A storage device 304, including a hard disk drive, a random access memory (RAM), and a read only memory (ROM), stores various information including the counted number of times of image formations and related history, which can be received via the communication I/F 303. A central processing unit (CPU) 305, connected to the devices 301 through 304, performs various control operations for the associated devices.

FIG. 5 illustrates an example maintenance history table 400 stored in the storage device 304 of the monitoring apparatus 110 illustrated in FIG. 1.

The maintenance history table 400 is prepared for each image-forming apparatus that can be identified by an image-forming apparatus ID.

The image-forming apparatus ID is attached to maintenance work start information or maintenance work end information received from the image-forming apparatus 100 via the communication I/F 303 illustrated in FIG. 4.

The CPU 305 stores maintenance work start/end information in the maintenance history table 400 identified by the attached image-forming apparatus ID.

The maintenance history table 400 includes various fields, i.e., history ID field 401, type of information field 402, maintenance work start/end field 403, and counter information field 404. The history ID field 401 describes identification number, which is automatically allocated by the monitoring apparatus 110 to identify reception information.

The type of information field 402 describes a code that determines whether the information received from the image-forming apparatus 100 is maintenance start information “1” or maintenance end information “2”, or provisional end information “3.”

The maintenance work start/end field 403 and the counter information field 404 describe time and counter information received from the image-forming apparatus 100 and stored in the storage device 304.

Figure 6:
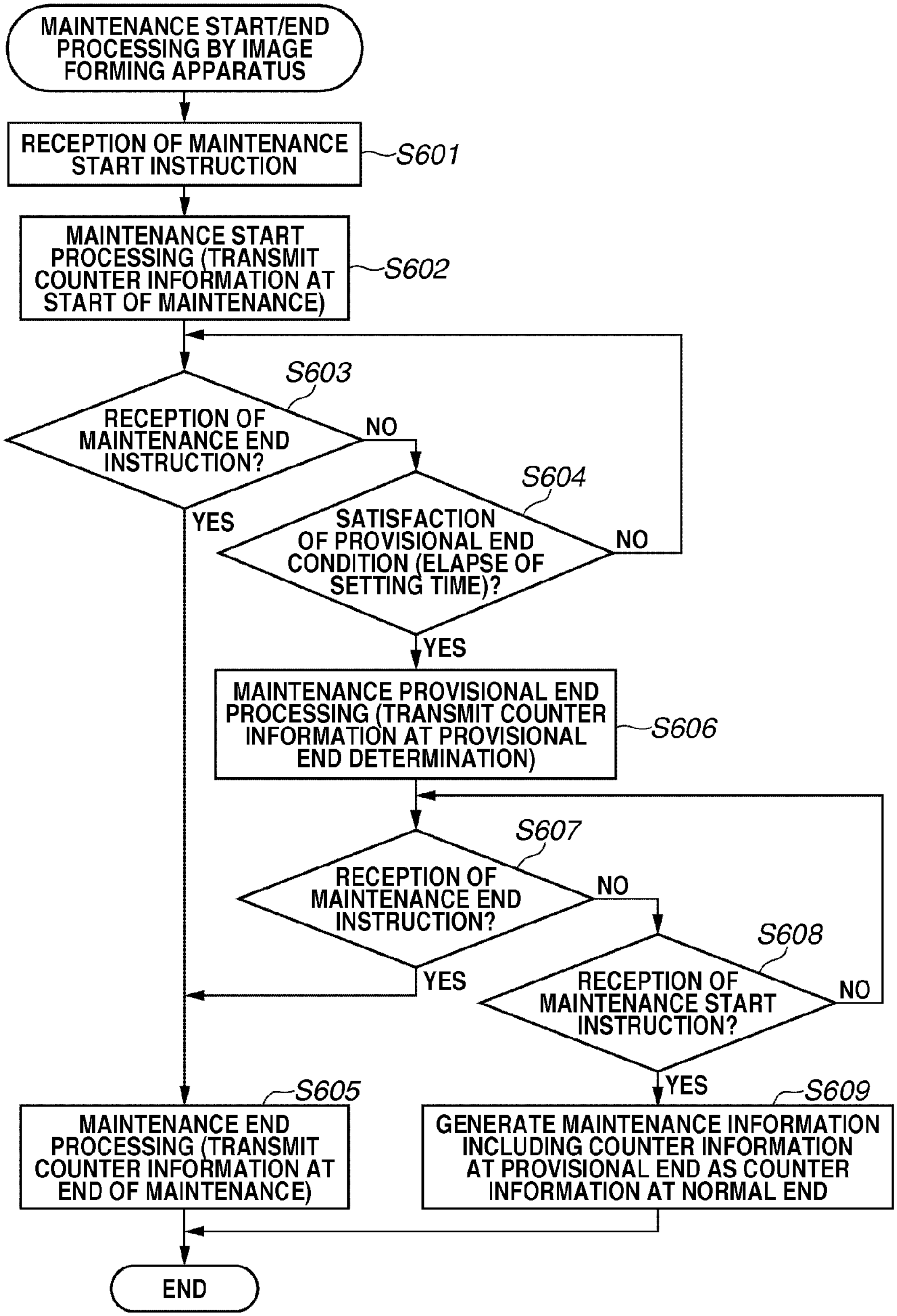
FIG. 6 is a flowchart illustrating an example data processing procedure performed by an image-forming apparatus according to an exemplary embodiment of the present invention.

FIG. 6 is a flowchart illustrating an example data processing procedure performed by an image-forming apparatus according to an exemplary embodiment. The data processing illustrated in FIG. 6 is maintenance processing performed by the image-forming apparatus 100. The notification control unit 205 of the image-forming apparatus 100 executes a control program loaded into a RAM to realize the processing performed in each step.

When a service engineer starts a maintenance work for the image-forming apparatus 100, the service engineer enters a maintenance start instruction via the maintenance start/end operation unit 201.

In step S601, the start/end operation reception unit 202 receives a maintenance start instruction from the service engineer who operates the maintenance start/end operation unit 201.

In step S602, the notification control unit 205 acquires counter information from the image formation amount management unit 204. The counter information is a count value counted by the counter, which represents the number of times of image formation performed by the image-forming unit 203. Next, the notification control unit 205 transmits, to the monitoring apparatus 110, maintenance work start information including work start time and image-forming apparatus ID and the counter information obtained from the image formation amount management unit 204.

When the monitoring apparatus 110 receives the maintenance work start information, the monitoring apparatus 110 stores the information in the maintenance history table 400 provided in the storage device 304 of the monitoring apparatus 110 illustrated in FIG. 1.

In this case, the CPU 305 newly issues a history ID for a new record, which is described in the field 401 of the maintenance history table 400. Furthermore, the CPU 305 stores “1” as index of start information in the type of information field 402. The CPU 305 stores time and counter information included in the received maintenance work start information in the maintenance work start/end field 403 and the counter information field 404.

When the service engineer finishes the maintenance work, the service engineer enters a maintenance end instruction via the maintenance start/end operation unit 201.

In an exemplary embodiment, the notification control unit 205 is configured to determine a provisional end of the maintenance work if a predetermined provisional end determination condition is satisfied, as described below.

The provisional end determination condition is, for example, a predetermined time elapsed after reception of a maintenance start instruction, detection of a power saving mode, or a predetermined number of output prints set by a remote operation.

The provisional end determination condition according to an exemplary embodiment is “30 minutes” elapsed after reception of a maintenance start instruction. The set time of "30 minutes" corresponds to the provisional maintenance time TM1 illustrated in FIG. 3.

In step S603, the notification control unit 205 determines whether a maintenance end instruction is received. In step S604, the notification control unit 205 determines whether the above-described provisional end condition is satisfied.

If in step S603 the notification control unit 205 determines that maintenance end instruction is received, the processing proceeds to step S605. In step S605, the notification control unit 205 acquires counter information from the image formation amount management unit 204. The counter information is a count value obtained by the counter that counts the number of times of image formation made by the image-forming apparatus 100. Next, the notification control unit 205 transmits, to the monitoring apparatus 110, maintenance end information (e.g., work end time and image-forming apparatus ID) generated based on the counter information obtained from the image formation amount management unit 204. Then, the image-forming apparatus 100 terminates the processing of this routine.

If the monitoring apparatus 110 receives maintenance work end information from the image-forming apparatus 100 (based on the processing in step S605), the monitoring apparatus 110 stores the received maintenance work end information in the maintenance history table 400.

In this case, the CPU 305 of the monitoring apparatus 110 newly issues a history ID for anew record, which is described in the history ID field 401 of the maintenance history table 400. Furthermore, the CPU 305 stores "2" as index of end information in the type of information field 402.

Furthermore, the CPU 305 stores time and counter information included in the received maintenance work end information in the maintenance work start/end field 403 and the counter information field 404 of the maintenance history table 400.

Thus, in the monitoring apparatus 110, the CPU 305 can refer to the maintenance history table 400 and can confirm the amount of image formation performed during the maintenance work based on a difference between work start counter information and work end counter information stored in the counter information field 404.

Furthermore, the CPU 305 detects a time required for the maintenance work based on a difference between work start date/time and work end date/time stored in the maintenance work start/end field 403.

If the notification control unit 205 receives no maintenance end instruction from the service engineer (NO in step S603) and measures 30 minutes after reception of the maintenance start instruction (YES in step S604), the notification control unit 205 provisionally determines that the maintenance work is finished. Then, the processing proceeds to step S606.

In step S606, the notification control unit 205 acquires counter information at time T2 from the image formation amount management unit 204. The notification control unit 205 transmits maintenance work provisional end information (e.g., provisional end determination time and image-forming apparatus ID) to the monitoring apparatus 110.

When the monitoring apparatus 110 receives maintenance work provisional end information, the monitoring apparatus 110 stores the received maintenance work provisional end information in the maintenance history table 400. In this case, the CPU 305 newly issues a history ID for a new record, which is described in the history ID field 401 of the maintenance history table 400. Furthermore, the CPU 305 stores "3" as index of provisional end information in the type of information field 402.

Similarly, the CPU 305 stores time information included in the maintenance work provisional end information received from the image-forming apparatus 100 in the maintenance work start/end field 403 of the maintenance history table 400. Furthermore, the CPU 305 stores counter information received from the image-forming apparatus 100 in the counter information field 404 of the maintenance history table 400.

The service engineer may enter a maintenance end instruction after the notification control unit 205 determines the provisional end of a maintenance in step S604. Hence, in step S607, the notification control unit 205 determines whether the start/end operation reception unit 202 receives a maintenance end instruction.

If the service engineer fails to enter a maintenance end instruction, the start/end operation reception unit 202 does not receive any maintenance end instruction. In this case, i.e., NO in step S607, the processing proceeds to step S608. In step S608, the notification control unit 205 determines whether the start/end operation reception unit 202 receives a start instruction for the next maintenance work.

More specifically, if in step S608 the notification control unit 205 receives a maintenance start instruction, the processing proceeds to step S609. In step S609, the notification control unit 205 generates maintenance information including the counter information stored in step S606 (i.e., counter information stored in the memory of the image formation amount management unit 204 at the provisional end determination) as counter information at normal end of the maintenance work. Then, the notification control unit 205 transmits the generated maintenance information to the monitoring apparatus 110. Then, the image-forming apparatus 100 terminates the processing of this routine.

According to the above-described exemplary embodiment, the notification control unit 205 generates maintenance information based on the second counter information and transmits the information including the second counter information to the monitoring apparatus 110. However, the notification control unit 205 can be configured to transmit information including a difference between the second counter information and the first counter information to the monitoring apparatus 110.

When the monitoring apparatus 110 receives maintenance work normal end information from the image-forming apparatus 100, the monitoring apparatus 110 stores the received information in the maintenance history table 400. More specifically, the CPU 305 newly issues a history ID for a new record, which is described in the history ID field 401 of the maintenance history table 400. Furthermore, the CPU 305 overwrites the value (="3") in the type of information field 402 (the provisional end information stored in step S606) with value "2" indicating normal end information. Furthermore, the CPU 305 stores time and counter information included in the received maintenance work end information in the maintenance work start/end field 403 and the counter information field 404.

If in step S607 the notification control unit 205 determines that a maintenance end instruction is received from the maintenance start/end operation unit 201 (i.e., when the service engineer enters a maintenance end instruction) after a period of 30 minutes has elapsed, the processing proceeds to step S605. Then, in step S605, the notification control unit 205 deletes the counter information at the provisional end determination (second counter information), which is stored in the memory of the image formation amount management unit 204 in step S606.

Furthermore, the notification control unit 205 acquires counter information at time T3 from the image formation amount management unit 204. Then, the notification control unit 205 transmits the counter information (third counter information) acquired from the image formation amount management unit 204, work end time (maintenance work end information), and an image-forming apparatus ID to the monitoring apparatus 110. Then, the image-forming apparatus 100 terminates the processing of this routine.

When the processing proceeds from step S607 to step S605, the monitoring apparatus 110 receives maintenance work end information from the image-forming apparatus 100 and stores the received maintenance work end information in the maintenance history table 400.

When the monitoring apparatus 110 receives a maintenance end instruction after the maintenance provisional end, the CPU 305 of the monitoring apparatus 110 calculates counter information in the following manner.

The CPU 305 refers to the maintenance history table 400 and obtains a difference between work start counter information and work end counter information, while discarding the counter information already acquired at the provisional end.

As a result, in the monitoring apparatus 110, the CPU 305 can accurately obtain the amount of image formation made during the maintenance work even when a maintenance end instruction is received after the provisional end of the maintenance.

Furthermore, the CPU 305 can calculate a time required for the maintenance work based on a difference between work start date/time and work end date/time stored in the maintenance work start/end field 403 of the maintenance history table 400.

Furthermore, if a service engineer fails to enter a maintenance end instruction and a start instruction for the next maintenance work is received in step S608, the processing proceeds to step S609.

According to the example illustrated in FIG. 5, provisional end information is not followed by work end information (corresponding to history ID=29) on the maintenance history table 400. Thus, the CPU 305 obtains a difference between work start counter information and provisional end counter information, which is stored in the counter information field 404. The monitoring apparatus 110 can estimate the amount of image formation made during the maintenance work.

Furthermore, the CPU 305 estimates a time required for the maintenance work based on a difference between work start date/time and provisional work end date/time, which are stored in the maintenance work start/end field 403 of the maintenance history table 400.

As described above, according to an exemplary embodiment, accurate work end information can be transmitted and stored in the monitoring apparatus 110 when a service engineer enters a maintenance end instruction, regardless of provisional end determination.

On the other hand, considering the possibility that a service engineer may fail to enter a maintenance end instruction, provisional end information at the provisional end determination can be also transmitted and stored in the monitoring apparatus 110.

Therefore, if a system is configured to perform accounting processing by excluding output prints made during a maintenance work, the above-described exemplary embodiment can prevent the system from being continuously kept in an inoperative state where every image formation is regarded as formation made for the maintenance work even after the maintenance work is finished.

According to the above-described exemplary embodiment, the processing in step S602 includes transmitting maintenance work start information after reception of a maintenance work start instruction in step S601. However, the maintenance work start information can be transmitted together with maintenance work end information in step S605 or together with provisional end information in step S606.

Furthermore, the processing in step S606 can include transmitting a mail to a predetermined address of a service engineer or an administrator to notify the determined provisional end of the maintenance work.

More specifically, if in step S606 the notification control unit 205 determines that the image-forming apparatus is in a provisional end state, the notification control unit 205 sends a mail notifying the provisional end determination of the maintenance work to a predetermined address of a service engineer or an administrator. In this case, the notification control unit 205 determines whether the first end condition is satisfied to identify the provisional end state of the image-forming apparatus.

The notification control unit 205 sends a mail notifying the provisional end determination of the maintenance work via the communication line 120 according to a protocol, such as TCP/IP.

Furthermore, the image-forming apparatus 100 can be configured to display the determined provisional end of the maintenance work on its display unit.

An exemplary embodiment can realize a flexible and reliable system that enables a service engineer to cancel the determined provisional end via the maintenance start/end operation unit 201.

Furthermore, if the operation menu includes items operable only by a service engineer, the system can be configured to prevent a user of the image-forming apparatus 100 from operating these items in step S606 after completing the provisional end determination, thereby preventing the user from performing unauthorized operations.

If there is a job that restricts processing during a maintenance work, the system can be configured to automatically restart the processing of this job in step S606 after completing the provisional end determination, thereby preventing the job from being suspended for a long time.

According to an exemplary embodiment, the notification control unit 205 determines that the second end condition is satisfied when a maintenance start instruction is received after provisional end counter information is stored in the memory of the image formation amount management unit 204. Then, the notification control unit 205 can transmit counter information corresponding to normal end of the maintenance work and an image-forming apparatus ID to the monitoring apparatus 110.

Thus, the monitoring apparatus 110 can manage counter information corresponding to normal end of the maintenance work received from the image-forming apparatus 100 as previous counter information at the maintenance end instruction.

Second Exemplary Embodiment

According to the above-described first exemplary embodiment, the monitoring apparatus 110 uses the maintenance history table 400, which may record both provisional end information and end information for the same maintenance work.

The maintenance history table 400 may also store provisional end information only (namely, the maintenance history table 400 may not store end information).

The configuration described in the first exemplary embodiment is effective to manage all of information relating to the maintenance. However, it may be difficult to accurately detect the amount of image formation made during a maintenance work and the time required for a maintenance work. An exemplary embodiment can solve the problem.

FIG. 7 illustrates another maintenance history table 500 stored in the storage device 304 of the monitoring apparatus 110 illustrated in FIG. 1.

The maintenance history table 400 illustrated in FIG. 5 allocates one record area to each of maintenance work start information and maintenance work end information.

The maintenance history table 500 according to an exemplary embodiment illustrated in FIG. 7 stores a combination of maintenance work start information and maintenance work end information. In other words, the maintenance history table 500 is different from the maintenance history table 400 in that only one record area is allocated to each maintenance work.

An exemplary embodiment provides the maintenance history table 500 illustrated in FIG. 7 for each image-forming apparatus 100 that can be identified by an allocated image-forming apparatus ID.

The communication I/F 303 of the monitoring apparatus 110 receives, from the image-forming apparatus 100, maintenance work start information or maintenance work end information to which image-forming apparatus ID is added.

The CPU 305 stores maintenance work start/end information to the maintenance history table 500 corresponding to the added image-forming apparatus ID.

Furthermore, the CPU 305 stores an identification number in a history ID field 501 of the maintenance history table 500. The identification number can be automatically allocated to maintenance work information by the monitoring apparatus 110.

Furthermore, the CPU 305 stores maintenance work start information received from the image-forming apparatus 100 in a maintenance work start/end field 502 and a start counter information field 503 of the maintenance history table 500.

Furthermore, the CPU 305 stores a maintenance work time, a count during the maintenance work, and maintenance work end information or provisional end information received from the image-forming apparatus 100 in a work time field 504, a count during work field 505, and a provisional flag field 506, respectively, of the maintenance history table 500.

Furthermore, the CPU 305 obtains a difference between work end date/time or provisional end determination date/time received from the image-forming apparatus 100 and the work start date/time already stored in the maintenance work start/end field 502. Then, the CPU 305 stores an obtained difference value in the work time field 504 of the maintenance history table 500.

Furthermore, the CPU 305 obtains a difference between work end counter information or counter information at the provisional end determination received from the image-forming apparatus 100 and counter information already stored in the start counter information field 503. Then, the CPU 305 stores the obtained difference value in the count during work field 505 of the maintenance history table 500.

Furthermore, the CPU 305 stores a flag indicating provisional information (information stored based on the provisional end determination) in the provisional flag field 506 of the maintenance history table 500. The processing performed by the image-forming apparatus 100 according to an exemplary embodiment is similar to the processing illustrated in FIG. 6 according to the first exemplary embodiment.

Example processing performed by the monitoring apparatus 110 is described below with reference to the flowchart illustrated in FIG. 8.

Figure 8:
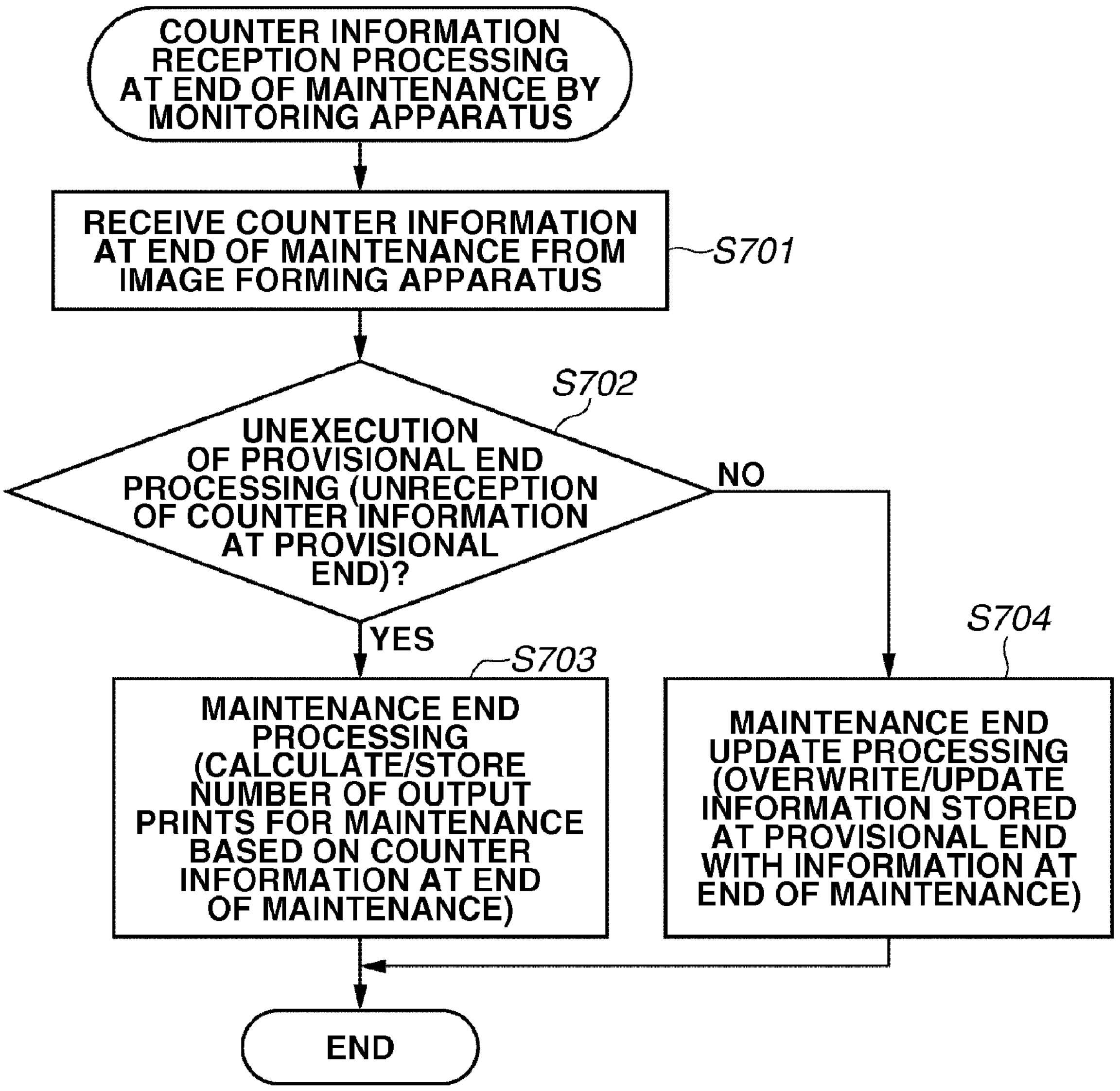
FIG. 8 is a flowchart illustrating an example data processing procedure performed by the monitoring apparatus according to an exemplary embodiment of the present invention.

FIG. 8 is a flowchart illustrating an example data processing procedure performed by the monitoring apparatus 110 according to an exemplary embodiment. The example data processing illustrated in FIG. 8 is end counter information reception processing performed by the monitoring apparatus 110. The CPU 305 of the monitoring apparatus 110 illustrated in FIG. 4 executes a control program stored in the storage device 304 to realize the processing performed in each step illustrated in FIG. 8.

When the start/end operation reception unit 202 of the image-forming apparatus 100 receives a maintenance start instruction, the notification control unit 205 transmits the received maintenance work start information to the monitoring apparatus 110.

When the CPU 305 of the monitoring apparatus 110 receives maintenance work start information from the image-forming apparatus 100, the CPU 305 stores the received maintenance work start information in the maintenance history table 500. In this case, the CPU 305 newly issues a history ID for a new record, which is described in the history ID field 501 of the maintenance history table 500. Furthermore, the CPU 305 stores time and counter information included in the received maintenance work start information in the maintenance work start/end field 502 and the start counter information field 503.

Furthermore, in response to reception of maintenance work start information, the CPU 305 temporarily stores NULL or an invalid value in the work time field 504, the count during work field 505, and the provisional flag field 506 of the maintenance history table 500.

Then, if the notification control unit 205 of the image-forming apparatus 100 determines that a maintenance end instruction is received before the above-described provisional end determination condition is satisfied, the notification control unit 205 transmits the received maintenance work end information to the monitoring apparatus 110. In this case, the maintenance end instruction can be entered by a service engineer.

In step S701, the CPU 305 of the monitoring apparatus 110 receives maintenance work end information from the image-forming apparatus 100. Then, the processing proceeds to step S702. In step S702, the CPU 305 refers to the maintenance history table 500 and determines whether there is provisional end information in the record storing maintenance work start information. When NULL or an invalid value is stored in the provisional flag field 506, the CPU 305 determines that the record does not include the provisional end information.

If in step S702 the CPU 305 determines that the provisional end processing is unexecuted, the processing proceeds to step S703. In step S703, the CPU 305 stores maintenance work information in the maintenance history table 500 based on the received maintenance work end information.

In this case, the CPU 305 obtains a difference between the receive work end date/time and the work start date/time already stored in the maintenance work start/end field 502 and stores the obtained difference in the work time field 504 corresponding to the record storing the maintenance work start information.

The content of the maintenance history table 500 is described below with reference to the progress of processing.

If the provisional end determination condition is satisfied prior to reception of a maintenance end instruction in the image-forming apparatus 100, the notification control unit 205 provisionally determines the end of the maintenance work. Then, the notification control unit 205 transmits maintenance work provisional end information to the monitoring apparatus 110 (refer to time T2 illustrated in FIG. 3).

The CPU 305 of the monitoring apparatus 110 stores maintenance work information in the maintenance history table 500 based on the maintenance work provisional end information received from the image-forming apparatus 100.

In this case, the CPU 305 obtains a difference between the received provisional end determination date/time and the work start date/time already stored in the maintenance work start/end field 502 and stores the obtained difference in the work time field 504 corresponding to the record storing the maintenance work start information.

Furthermore, the CPU 305 obtains a difference between the received counter information at the provisional end determination and the counter information already stored in the start counter information field 503 and stores the obtained difference in the count during work field 505 of the maintenance history table 500.

Furthermore, the CPU 305 stores a value indicating provisional end ("1" according to the maintenance history table 500 illustrated in FIG. 5) in the provisional flag field 506 of the maintenance history table 500.

If the service engineer fails to enter a maintenance end instruction, the CPU 305 does not receive the maintenance end instruction after the provisional end determination.

If a maintenance end instruction based on an operation of the service engineer is received after the notification control unit 205 determines a provisional end, the image-forming apparatus 100 transmits maintenance work end information based on the maintenance end instruction to the monitoring apparatus 110.

In step S702, namely, when the monitoring apparatus 110 receives maintenance work end information from the image-forming apparatus 100, the CPU 305 determines whether provisional end information is included in the record storing maintenance work start information. According to an example embodiment, the CPU 305 determines whether the provisional flag is "1."

In step S704, the CPU 305 updates the maintenance work information of the maintenance history table 500 based on the information received from the image-forming apparatus 100.

In this case, the CPU 305 obtains a difference between work end date/time received from the image-forming apparatus 100 and the work start date/time already stored in the maintenance work start/end field 502. Then, the CPU 305 overwrites the information stored in the work time field 504 (information stored based on provisional end determination) with the obtained difference.

Furthermore, the CPU 305 obtains a difference between the received work end counter information and the counter information already stored in the start counter information field 503. Then, the CPU 305 overwrites the information stored in the count during work field 505 of the maintenance history table 500 with the obtained difference. In this case, the CPU 305 changes the content of the provisional flag field 506 to a value not indicating the provisional end ("0" according to the maintenance history table 500 illustrated in FIG. 5).

Therefore, regardless of provisional end determination or maintenance end instruction, the monitoring apparatus 110 can confirm the amount of image formation made during maintenance work by referring to the count during work field 505 of the maintenance history table 500. Furthermore, the monitoring apparatus 110 can confirm the time required for a maintenance work performed for the image-forming apparatus 100.

As described above, according to an exemplary embodiment, accurate work end information can be transmitted and stored in the monitoring apparatus 110 when a service engineer enters a maintenance end instruction, regardless of provisional end determination.

If a service engineer fails to enter an end instruction, provisional end information based on the provisional end determination is stored in the monitoring apparatus 110.

Therefore, even if a system is configured to perform accounting processing by excluding output prints made during a maintenance work, the above-described exemplary embodiment can prevent the system from being continuously kept in an inoperative state where every image formation is regarded as formation made for the maintenance work even after the maintenance work is finished.

Third Exemplary Embodiment

According to the above-described first and second exemplary embodiments, when a provisional end of a maintenance work is determined, the image-forming apparatus 100 transmits provisional end information to the monitoring apparatus 110. Then, if a service engineer enters a maintenance end instruction, the image-forming apparatus 100 transmits maintenance work end information to the monitoring apparatus 110.

The first exemplary embodiment is effective to enable an operator of the monitoring apparatus 110 to constantly confirm the latest status of each image-forming apparatus including the provisional end.

However, if the end information (including provisional end information) is transmitted two or more times for the same maintenance work, the monitoring apparatus 110 is required to perform complicated processing. The following exemplary embodiment can solve the problem.

A hardware configuration according to the third exemplary embodiment is similar to that of the first exemplary embodiment described in FIGS. 1 through 3.

Figure 9:
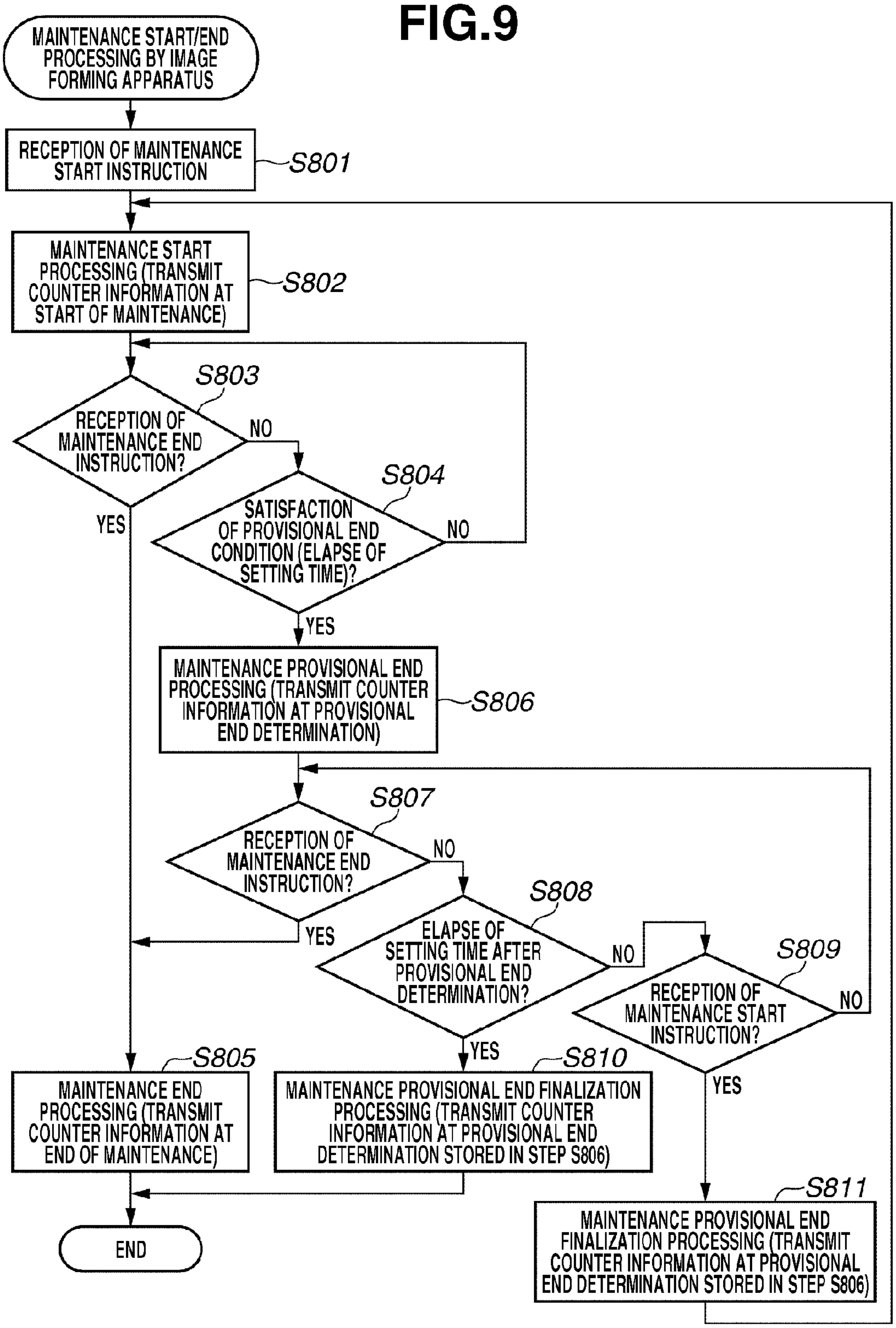
FIG. 9 is a flowchart illustrating an example data processing procedure performed by the image-forming apparatus according to an exemplary embodiment of the present invention.

FIG. 9 is a flowchart illustrating an example data processing procedure performed by the image-forming apparatus 100 according to an exemplary embodiment. The example data processing illustrated in FIG. 9 is example maintenance processing performed by the image-forming apparatus 100 illustrated in FIG. 1. The notification control unit 205 of the image-forming apparatus 100 executes a control program loaded into a RAM to realize the processing performed in each step illustrated in FIG. 9.

When a service engineer starts maintenance work for the image-forming apparatus 100, the service engineer operates the maintenance start/end operation unit 201 to enter a maintenance start instruction.

In step S801, the start/end operation reception unit 202 receives a maintenance start instruction from a service engineer. Then, the processing proceeds to step S802. In step S802, the notification control unit 205 acquires counter information from the image formation amount management unit 204. The counter information is a count value counted by the counter, which represents the number of times of image formation performed by the image-forming unit 203. Next, the notification control unit 205 transmits, to the monitoring apparatus 110, maintenance work start information including work start time and image-forming apparatus ID and the counter information obtained from the image formation amount management unit 204.

When the CPU 305 of the monitoring apparatus 110 receives the above-described maintenance work start information from the image-forming apparatus 100, the CPU 305 stores the maintenance work start information in the maintenance history table 500.

In this case, the CPU 305 newly issues a history ID for a new record, which is described in the history ID field 501 of the maintenance history table 500. Furthermore, the CPU 305 stores time and counter information included in the maintenance work start information received from the image-forming apparatus 100 in the maintenance work start/end field 502 and the start counter information field 503.

Furthermore, the CPU 305 temporarily stores NULL or an invalid value in the work time field 504, the count during work field 505, and the provisional flag field 506 of the maintenance history table 500.

In general, if a service engineer finishes a maintenance work for the image-forming apparatus 100, the service engineer enters a maintenance end instruction via the maintenance start/end operation unit 201.

The notification control unit 205 is configured to determine a provisional end of the maintenance work if the provisional end determination condition is satisfied.

The provisional end determination condition is, for example, a predetermined time elapsed after reception of a maintenance start instruction, the detection of a power saving mode, or a predetermined number of output prints set by a remote operation.

The provisional end determination condition according to an exemplary embodiment is "30 minutes" elapsed after reception of a maintenance start instruction.

In step S803, the notification control unit 205 determines whether a maintenance end instruction is received. In step S804, the notification control unit 205 determines whether the above-described provisional end determination condition (30 minutes elapsed after reception of a maintenance start instruction) is satisfied.

If the notification control unit 205 determines that reception of a maintenance end instruction is detected first (YES in step S803), the processing proceeds to step S805. In step S805, the notification control unit 205 executes maintenance end processing. Then, the image-forming apparatus 100 terminates the processing of this routine.

In step S805, the notification control unit 205 acquires, from the image formation amount management unit 204, counter information obtained by the counter that counts the number of times of image formation made. The notification control unit 205 transmits, to the monitoring apparatus 110, maintenance work end information including the acquired counter information together with work end time and an image-forming apparatus ID.

As described above, the monitoring apparatus 110 receives maintenance work end information from the image-forming apparatus 100. The monitoring apparatus 110 stores the received maintenance work end information in the maintenance history table 500. In this case, the CPU 305 of the monitoring apparatus 110 obtains a difference between the received work end date/time and the work start date/time already stored in the maintenance work start/end field 502. Then, the CPU 305 stores the obtained difference in the work time field 504 corresponding to the record storing the maintenance work start information.

Then, the CPU 305 of the monitoring apparatus 110 obtains a difference between the received work end counter information and the counter information already stored in the start counter information field 503. Then, the CPU 305 stores the obtained difference in the count during work field 505 of the maintenance history table 500.

Furthermore, the CPU 305 of the monitoring apparatus 110 stores a value not indicating the provisional end ("0" according to the example illustrated in FIG. 5) in the provisional flag field 506.

If the notification control unit 205 determines that no maintenance end instruction is received (NO in step S803) and measures 30 minutes after reception of a maintenance start instruction (YES in step S804), the notification control unit 205 provisionally determines that the maintenance work is finished. Then, the processing proceeds to step S806.

In step S806, the notification control unit 205 acquires counter information (a count value obtained by the counter that counts the number of times of image formation made) from the image formation amount management unit 204. The notification control unit 205 stores the acquired counter information together with time information corresponding to the provisional end determination in the memory of the notification control unit 205.

The service engineer may enter a maintenance work instruction even after the notification control unit 205 determines the provisional end in step S804. Hence, the notification control unit 205 waits for a sufficient time to check if a maintenance end instruction is received in steps S807 through S809.

In an exemplary embodiment, the sufficient time is a sufficiently long time compared to the time relating to the maintenance (e.g., 24 hours after provisional end determination, 2 AM on the next day, etc.) and can be set beforehand.

The sufficiently long time according to an exemplary embodiment is "until 2 AM subsequent to provisional end determination."

For example, if the notification control unit 205 determines that a maintenance end instruction is received before 2 AM on the day following the provisional end determined in step S804 (YES in step S807), the processing proceeds to step S805.

If the service engineer fails to enter a maintenance end instruction and no maintenance end instruction is received in step S807, and if the notification control unit 205 determines that the current time is after 2 AM on the next day (YES in step S808), the processing proceeds to step S810.

In step S810, the notification control unit 205 transmits, to the monitoring apparatus 110, maintenance work provisional end information including counter information and time information stored in step S806 (information stored in the memory at the provisional end determination) together with the image-forming apparatus ID. Then, the image-forming apparatus 100 terminates the processing of this routine.

In this case, the monitoring apparatus 110 stores maintenance work information in the maintenance history table 500 based on the information received from the image-forming apparatus 100.

In this case, the CPU 305 of the monitoring apparatus 110 obtains a difference between the received provisional end determination date/time and the work start date/time already stored in the maintenance work start/end field 502. Then, the CPU 305 stores the obtained difference in the work time field 504 corresponding to the record storing maintenance work start information.

Furthermore, the CPU 305 obtains a difference between the received counter information at the provisional end determination and the counter information already stored in the start counter information field 503. Then, the CPU 305 stores the obtained difference in the count during work field 505 of the maintenance history table 500.

Furthermore, the CPU 305 stores a value indicating the provisional end ("1" according to the maintenance history table 500 illustrated in FIG. 5) in the provisional flag field 506.

If the notification control unit 205 determines that the current time is before 2 AM on the setting day (NO in step S808) and determines that a start instruction for the next maintenance work is received (YES in step S809), the processing proceeds to step S811. The maintenance work performed by the service engineer in this case is, for example, replacement of parts in the image-forming apparatus 100.

In step S811, similar to step S810, the notification control unit 205 transmits, to the monitoring apparatus 110, maintenance work provisional end information including counter information and time information stored in step S806 (information stored in the memory at the provisional end determination) together with the image-forming apparatus ID.

Furthermore, the CPU 305 of the monitoring apparatus 110 stores maintenance work information in the maintenance history table 500 based on the information received from the notification control unit 205 of the image-forming apparatus 100.

Next, the processing returns to step S802. The notification control unit 205 newly starts maintenance start/end processing.

As described above, regardless of provisional end determination or maintenance end instruction, the monitoring apparatus 110 can confirm the amount of image formation made during a maintenance work by referring to the count during work field 505 of the maintenance history table 500.

Furthermore, the monitoring apparatus 110 can confirm the time required for a maintenance work by referring to the work time field 504.

As described above, according to an exemplary embodiment, accurate work end information can be transmitted and stored in the monitoring apparatus 110 when a service engineer enters a maintenance end instruction, regardless of provisional end determination.

On the other hand, if a service engineer fails to enter a maintenance end instruction, provisional end information based on provisional end determination is transmitted and stored in the monitoring apparatus 110.

Therefore, even if a system is configured to perform accounting processing by excluding output prints made during a maintenance work, the above-described exemplary embodiment can prevent the system from being continuously kept in an inoperative state where every image formation is regarded as formation made for the maintenance work even after the maintenance work is finished.

Furthermore, the third exemplary embodiment is different from the first exemplary embodiment in that maintenance end information (including provisional end information) is transmitted only once.

According to the above-described exemplary embodiment, the processing in step S802 includes transmitting maintenance work start information after reception of a maintenance work start instruction in step S801. However, the maintenance work start information can be transmitted together with maintenance work end information in step S805 or together with provisional end information in step S810 or S811.

Furthermore, the processing in step S806 can include transmitting a mail to a predetermined address of a service engineer or an administrator to notify the determined provisional end of the maintenance work.

Furthermore, the image-forming apparatus 100 can be configured to display the determined provisional end of the maintenance work on its display unit.

An exemplary embodiment can realize a flexible and reliable system that enables a service engineer to cancel the determined provisional end via the maintenance start/end operation unit 201.

As described above, an exemplary embodiment can solve the problem occurring in the case of failure in performing a maintenance end operation when a service engineer finishes a maintenance work for an image-forming apparatus. Therefore, the monitoring apparatus 101 can acquire flexible and reliable maintenance information from the image-forming apparatus 100.

Fourth Exemplary Embodiment

According to the first through third exemplary embodiments, the image-forming apparatus 100 performs the processing for determining a provisional end of a maintenance work. However, the monitoring apparatus 110 can be configured to determine a provisional end of a maintenance work based on information relating to start/end of a maintenance work, which is received from the image-forming apparatus 100. The following exemplary embodiment provides the monitoring apparatus 110 that can determine a provisional end of a maintenance work. A hardware configuration according to the fourth exemplary embodiment is similar to that of the first exemplary embodiment described in FIGS. 1 through 3.

Figure 10:
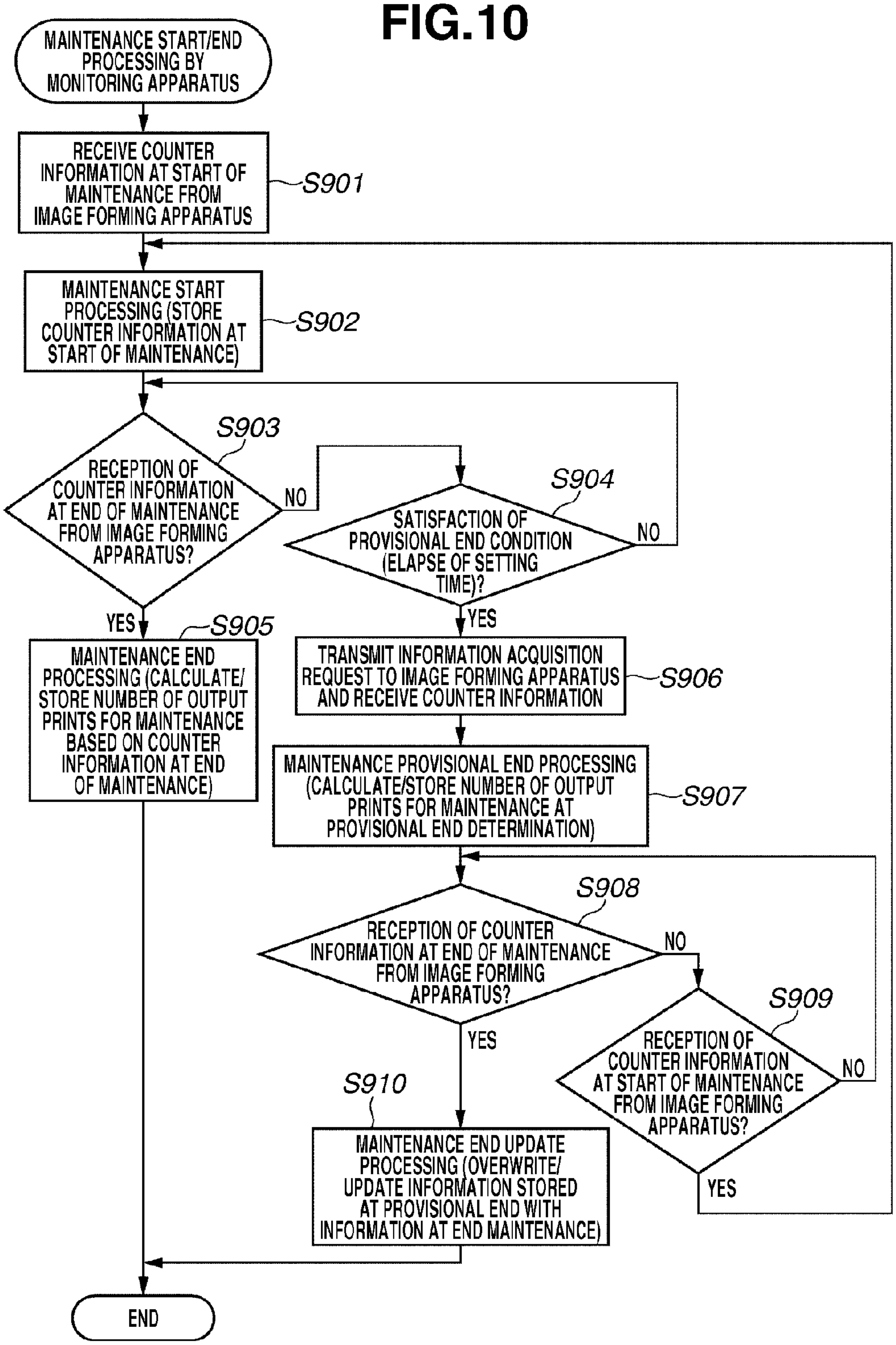
FIG. 10 is a flowchart illustrating an example data processing procedure performed by the monitoring apparatus according to an exemplary embodiment of the present invention.

FIG. 10 is a flowchart illustrating an example data processing procedure performed by the monitoring apparatus 110 according to an exemplary embodiment. The example data processing illustrated in FIG. 10 is end counter information reception processing performed by the monitoring apparatus 110. The CPU 305 of the monitoring apparatus 110 illustrated in FIG. 4 executes a control program stored in the storage device 304 to realize the processing performed in each step illustrated in FIG. 10.

When a service engineer starts a maintenance work for the image-forming apparatus 100, the service engineer operates the maintenance start/end operation unit 201 to enter a maintenance start instruction. When the start/end operation reception unit 202 receives a maintenance start instruction from the service engineer, the notification control unit 205 acquires counter information from the image formation amount management unit 204. The counter information is a count value obtained by the counter that counts the number of times of image formation made. Then, the notification control unit 205 transmits, to the monitoring apparatus 110, maintenance work start information including the acquired counter information together with the image-forming apparatus ID.

The monitoring apparatus 110 stores maintenance work start/end information in its maintenance history table 500 and manages the information stored in the table 500.

In step S901, the monitoring apparatus 110 receives maintenance work start information from the image-forming apparatus 100. In step S902, the monitoring apparatus 110 stores the maintenance work start information received from the image-forming apparatus 100 in the maintenance history table 500. In this case, the CPU 305 newly issues a history ID for a new record, which is described in the history ID field 501 of the maintenance history table 500. Furthermore, the CPU 305 stores the reception time of the maintenance work start information in the maintenance work start/end field 502.

Furthermore, the CPU 305 stores counter information included in the received maintenance work start information in the start counter information field 503 of the maintenance history table 500.

Moreover, the CPU 305 temporarily stores NULL or an invalid value in the work time field 504, the count during work field 505, and the provisional flag field 506 of the maintenance history table 500.

In general, a service engineer enters a maintenance work end instruction upon finishing the maintenance work.

Then, if the start/end operation reception unit 202 receives a maintenance work end instruction, the notification control unit 205 acquires counter information from the image formation amount management unit 204. The counter information is a count value obtained by the counter that counts the number of times of image formation made. Then, the notification control unit 205 transmits, to the monitoring apparatus 110, maintenance work end information including the acquired counter information together with the image-forming apparatus ID.

The monitoring apparatus 110 is configured to provisionally determine that the maintenance work is finished if the provisional end determination condition is satisfied.

The provisional end determination condition is, for example, s predetermined time elapsed after reception of a maintenance start instruction, the detection of a power saving mode, and a predetermined number of output prints set by a remote operation.

The provisional end determination condition according to an exemplary embodiment is "30 minutes" elapsed after reception of a maintenance start instruction.

In step S903, the CPU 305 determines whether maintenance work end information is received from the image-forming apparatus 100. In step S904, the CPU 305 determines whether the provisional end determination condition is satisfied. In this case, the provisional end determination condition is 30 minutes elapsed after reception of the maintenance start instruction.

If the CPU 305 determines that maintenance work end information is received before 30 minutes elapsed after reception of a maintenance start instruction (YES in step S903), the processing proceeds to step S905. In step S905, the CPU 305 stores maintenance work information according to the received maintenance work end information and terminates the processing of this routine.

In this case, the CPU 305 obtains a difference between the reception time of the work end information and the work start date/time already stored in the maintenance work start/end field 502. Then, the CPU 305 stores the obtained difference in the work time field 504 corresponding to the record storing the maintenance work start information.

Furthermore, the CPU 305 obtains a difference between the receives work end counter information and the counter information already stored in the start counter information field 503. Then, the CPU 305 stores the obtained difference in the count during work field 505 of the maintenance history table 500.

Furthermore, the CPU 305 stores a value not indicating the provisional end ("0" according to the maintenance history table 500 illustrated in FIG. 7) in the provisional flag field 506 of the maintenance history table 500.

If the CPU 305 determines that no maintenance work end information is received (NO in step S903) and measures 30 minutes after reception of the maintenance start instruction (YES in step S904), the CPU 305 provisionally determines that the maintenance work is finished. Then, the processing proceeds to step S906.

In step S906, the CPU 305 transmits a counter information acquisition request to the image-forming apparatus 100 and acquires counter information from the image-forming apparatus 100.

In step S907, the CPU 305 stores the maintenance work information acquired from the image-forming apparatus 100 in the maintenance history table 500 and terminates the processing of this routine.

In this case, the CPU 305 obtains a difference between the time corresponding to the provisional end determination (time corresponding to 30 minutes elapsed) and the work start date/time already stored in the maintenance work start/end field 502. Then, the CPU 305 stores the obtained difference in the work time field 504 corresponding to the record storing the maintenance work start information.

Furthermore, the CPU 305 obtains a difference between the counter information acquired at the provisional end determination and the counter information already stored in the start counter information field 503. Then, the CPU 305 stores the obtained difference in the count during work field 505.

Furthermore, the CPU 305 stores a value indicating the provisional end ("1" according to the maintenance history table 500 illustrated in FIG. 7) in the provisional flag field 506.

The service engineer may enter a maintenance end instruction even after the provisional end is determined by the CPU 305 in step S904. Hence, in step S908, the CPU 305 waits for a while to determine whether maintenance work end information is received from the image-forming apparatus 100.

If the service engineer fails to enter a maintenance end instruction, the CPU 305 does not receive any maintenance work end information. In this case, in step S909, the CPU 305 determines whether maintenance work start information for the next maintenance work is received.

If the CPU 305 determines that maintenance work end information is received (YES in step S908), the processing proceeds to step S910. In step S910, the CPU 305 updates the maintenance work information of the maintenance history table 500 based on the received maintenance work end information. Then, the CPU 305 terminates the processing of this routine.

In this case, the CPU 305 obtains a difference between the reception time of the work end information and the work start date/time already stored in the maintenance work start/end field 502. Then, the CPU 305 overwrites the information stored in the work time field 504 (information stored based on provisional end determination) with the obtained difference.

Furthermore, the CPU 305 obtains a difference between the received work end counter information and the counter information already stored in the start counter information field 503. Then, the CPU 305 overwrites the information stored in the count during work field 505 with the obtained difference.

Furthermore, the CPU 305 changes the content of the provisional flag field 506 to a value not indicating the provisional end ("0" according to the example illustrated in FIG. 7).

If the service engineer fails to enter a maintenance end instruction and the CPU 305 determines that maintenance work start information for the next maintenance work is received (YES in step S906), the processing returns to step S902. Then, in step S902, the CPU 305 newly starts the maintenance start/end processing.

As described above, regardless of provisional end determination or maintenance end instruction, the monitoring apparatus 110 can confirm the amount of image formation made during a maintenance work by referring to the count during work field 505 of the maintenance history table 500.

Furthermore, the monitoring apparatus 110 can confirm the time required for a maintenance work by referring to the work time field 504.

As described above, according to an exemplary embodiment, accurate work end information can be transmitted and stored in the monitoring apparatus 110 when a service engineer enters a maintenance end instruction, regardless of provisional end determination.

On the other hand, if a service engineer fails to enter a maintenance end instruction, provisional end information based on provisional end determination is transmitted and stored in the monitoring apparatus 110.

Therefore, even if a system is configured to perform accounting processing by excluding the number of output prints (the number of times of image formation) made by the image-forming apparatus 100 during a maintenance work, the above-described exemplary embodiment can prevent the system from being continuously kept in an inoperative state where every image formation is regarded as formation made for the maintenance work even after the maintenance work is finished.

According to an exemplary embodiment, the monitoring apparatus 110 can be connected to another monitoring apparatus that operates as a local monitoring apparatus. The monitoring apparatus 110 can transmit maintenance work start/end information and provisional end information to the local monitoring apparatus.

The monitoring apparatus 110 can operate as a local monitoring apparatus connected to the image-forming apparatus 100 via a LAN. In this case, the local monitoring apparatus performs provisional end determination and notifies a central monitoring apparatus of maintenance information.

As described above, an exemplary embodiment can solve the problem occurring in the case of failure in performing a maintenance end operation when a service engineer finishes a maintenance work for an image-forming apparatus. Therefore, the monitoring apparatus 110 can acquire flexible and reliable maintenance information from the image-forming apparatus 100.

Fifth Exemplary Embodiment

According to the above-described exemplary embodiments, the notification control unit 205 transmits, to the monitoring apparatus 110, counter information stored in the memory of the image formation amount management unit 204 at times T2 and T3. Thus, the above-described exemplary embodiments can prevent the counter information from being left without being informed appropriately in the event that a service engineer fails to enter a maintenance end instruction.

However, the above-described exemplary embodiments may not sufficiently satisfy the requirement of time management for a maintenance work.

The following exemplary embodiment can accurately manage the maintenance time.

Figure 11:
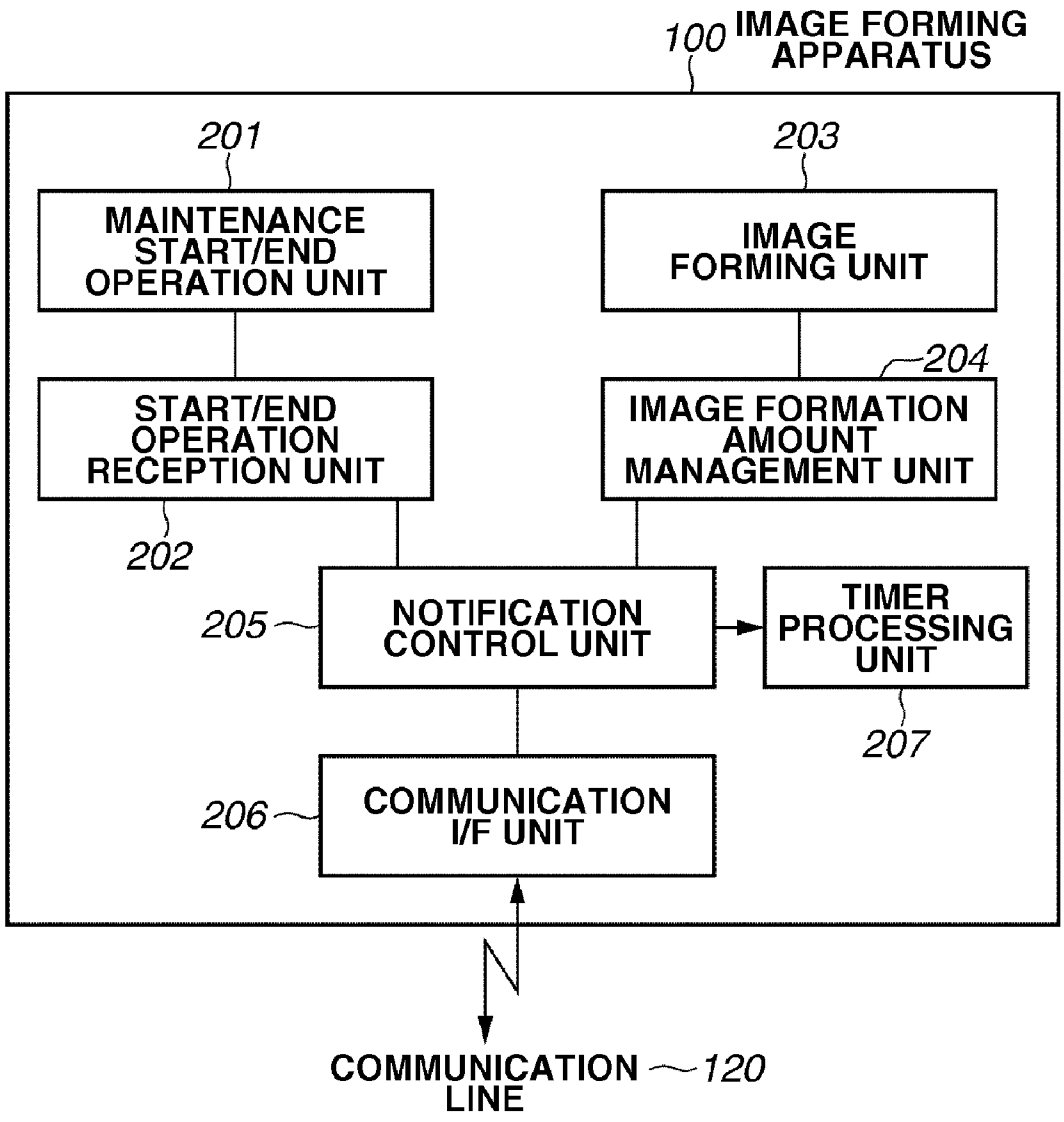
FIG. 11 is a block diagram illustrating an example configuration of the image-forming apparatus according to an exemplary embodiment of the present invention.

FIG. 11 is a block diagram illustrating an example configuration of the image-forming apparatus 100 illustrated in FIG. 1. In FIG. 11, components similar to those illustrated in FIG. 2 are denoted by the same reference numerals.

In FIG. 11, a timer processing unit 207 measures reception time of a maintenance start/end instruction, which is received by the maintenance start/end operation unit 201. The timer processing unit 207 stores measured time in its memory.

Figure 12:
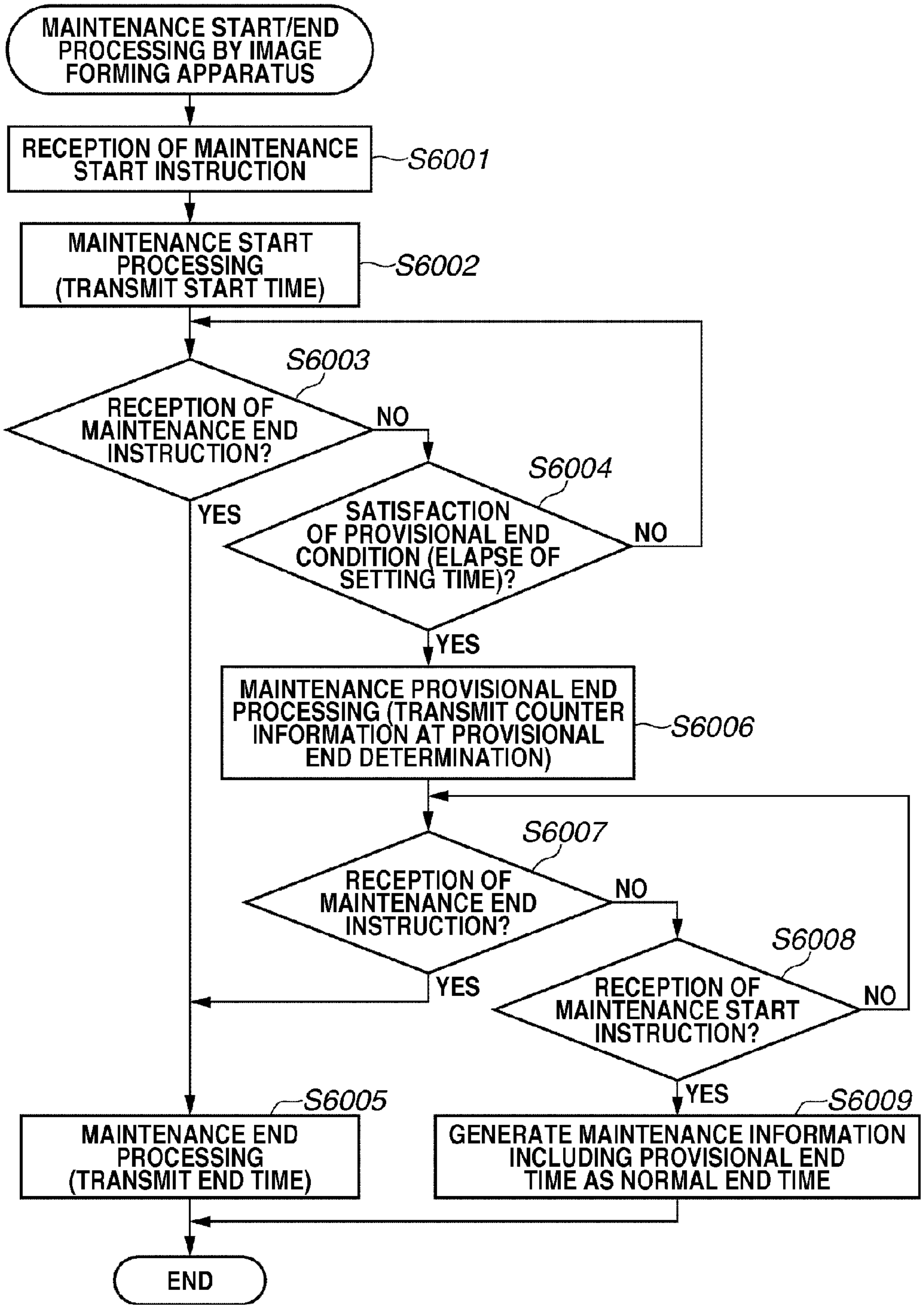
FIG. 12 is a flowchart illustrating an example data processing procedure performed by the image-forming apparatus according to an exemplary embodiment of the present invention.

FIG. 12 is a flowchart illustrating an example data processing procedure performed by the image-forming apparatus 100 according to an exemplary embodiment. The example data processing illustrated in FIG. 12 is maintenance processing performed by the image-forming apparatus 100. The notification control unit 205 of the image-forming apparatus 100 executes a control program loaded into a RAM to realize the processing performed in each step illustrated in FIG. 12.

When a service engineer starts maintenance work for the image-forming apparatus 100, the service engineer operates the maintenance start/end operation unit 201 to enter a maintenance start instruction.

In step S6001, the start/end operation reception unit 202 receives a maintenance start instruction, which is entered by the service engineer via the maintenance start/end operation unit 201. In step S6002, the notification control unit 205 stores a reception time of the maintenance start instruction in the memory of the timer processing unit 207 in response to reception of the maintenance start instruction.

Furthermore, the notification control unit 205 transmits, to the monitoring apparatus 110, maintenance work start information including work start time, an image-forming apparatus ID, and counter information acquired from the image formation amount management unit 204.

As described above, when the monitoring apparatus 110 receives maintenance work start information, the CPU 305 stores work start time and counter information in the maintenance history table 400 of the storage device 304 illustrated in FIG. 1.

In this case, the CPU 305 newly issues a history ID for a new record, which is described in the history ID field 401 of the maintenance history table 400. Furthermore, the CPU 305 stores "1" as index of start information in the type of information field 402.

Furthermore, the CPU 305 stores the time information included in the received maintenance work start information and the received counter information in the maintenance work start/end field 403 and the counter information field 404.

In general, a service engineer enters a maintenance end instruction via the maintenance start/end operation unit 201 upon finishing the maintenance work.

In an exemplary embodiment, the notification control unit 205 is configured to determine a provisional end of the maintenance work if a predetermined provisional end determination condition is satisfied.

The provisional end determination condition is, for example, a predetermined time elapsed after reception of a maintenance start instruction, the detection of a power saving mode, or a predetermined number of output prints set by a remote operation.

The provisional end determination condition according to an exemplary embodiment is "30 minutes" elapsed after reception of a maintenance start instruction. The set time of "30 minutes" corresponds to the provisional maintenance time TM1 illustrated in FIG. 3.

In step S6003, the notification control unit 205 determines whether a maintenance end instruction is received. In step S6004, the notification control unit 205 determines whether the above-described provisional end condition is satisfied.

If in step S6003 the notification control unit 205 determines that a maintenance end instruction is received, the processing proceeds to step S6005.

Then, the notification control unit 205 acquires end time information stored in the memory of the timer processing unit 207. Next, the notification control unit 205 transmits, to the monitoring apparatus 110, work end time information based on counter information acquired from the timer processing unit 207 together with the image-forming apparatus ID. Then, the notification control unit 205 terminates the processing of this routine.

If the monitoring apparatus 110 receives maintenance work end information from the image-forming apparatus 100

(based on the processing in step S6005), the monitoring apparatus 110 stores the maintenance work end information in the maintenance history table 400.

In this case, the CPU 305 newly issues a history ID for a new record, which is described in the history ID field 401 of the maintenance history table 400. Furthermore, the CPU 305 stores “2” as index of end information in the type of information field 402.

Thus, in the monitoring apparatus 110, the CPU 305 can refer to the maintenance history table 400 and can accurately confirm a maintenance work time based on a difference between work start time and work end time.

If the notification control unit 205 determines that no maintenance end instruction is received from the service engineer (NO in step S6003) and measures 30 minutes after reception of a maintenance start instruction (YES in step S6004), the notification control unit 205 provisionally determines that the maintenance work is finished. Then, the processing proceeds to step S6006.

In step S6006, the notification control unit 205 acquires maintenance work provisional end time (time T2) from the timer processing unit 207. Then, the notification control unit 205 transmits the acquired information together with the image-forming apparatus ID to the monitoring apparatus 110.

The service engineer may enter a maintenance end instruction even after the notification control unit 205 determines a provisional end in step S6004. Hence, in step S6007, the notification control unit 205 waits for a while to determine whether maintenance work end information is received from the service engineer via the start/end operation reception unit 2020.

If the service engineer fails to enter a maintenance end instruction, no maintenance end instruction is received. In this case, i.e., NO in step S6007, the processing proceeds to step S6008. In step S6008, the notification control unit 205 determines whether a maintenance start instruction for the next maintenance work is received.

If in step S6008 the notification control unit 205 determines that a maintenance start instruction is received, the notification control unit 205 determines that the second end condition is satisfied.

In step S6009, the notification control unit 205 generates maintenance information including provisional end time stored in the memory of the timer processing unit 207, which is regarded as normal end time. Then, the notification control unit 205 transmits the generated maintenance information and the image-forming apparatus ID to the monitoring apparatus 110. Then, the notification control unit 205 terminates the processing of this routine.

If in step S6007 the notification control unit 205 determines that a maintenance end instruction is received from the service engineer after a period of 30 minutes has elapsed, the processing proceeds to step S6005. Then, in step S6005, the notification control unit 205 acquires end time information from the timer processing unit 207.

Then, the notification control unit 205 transmits, the monitoring apparatus 110, maintenance work end information including end time information acquired from the timer processing unit 207 together with the image-forming apparatus ID. Then, the notification control unit 205 terminates the processing of this routine.

If the processing proceeds from step S6007 to step S6005, i.e., if the monitoring apparatus 110 receives maintenance work end information from the image-forming apparatus 100, the CPU 305 stores the maintenance work end information in the maintenance history table 400.

According to an exemplary embodiment, if a maintenance start instruction is received prior to a maintenance end instruction after provisional end time information is stored in the memory of the timer processing unit 207, it is determined that the second end condition is satisfied. In this case, the notification control unit 205 regards the already stored provisional end time as normal end time and transmits the normal end time and the image-forming apparatus ID to the monitoring apparatus 110.

More specifically, the operation end instruction may not be received after reception of an operation start instruction entered by a service engineer and the provisional end is determined. Even in such a situation, when the next operation start instruction is received from a service engineer, the notification control unit 205 can transmit the provisional end time as instruction end time of the previous operation to the monitoring apparatus 110.

The monitoring apparatus 110 deletes the already received provisional end time and stores the received instruction end time of the previous operation in the maintenance history table 400. Thus, an exemplary embodiment enables a user to accurately confirm the maintenance work time based on the maintenance start and end information.

Sixth Exemplary Embodiment

An example configuration of a data processing program readable by an image forming system including an image-forming apparatus and an information-processing apparatus according to an exemplary embodiment of the present invention is described with reference to memory maps illustrated in FIGS. 13 and 14.

FIG. 13 illustrates an example memory map of a storage medium that stores various data processing programs readable by the image-forming apparatus according to an exemplary embodiment of the present invention.

FIG. 14 illustrates an example memory map of a storage medium that stores various data processing programs readable by the information-processing apparatus according to an exemplary embodiment of the present invention. In an exemplary embodiment, the monitoring apparatus 110 operates as an information-processing apparatus.

Although not illustrated in the drawing, the storage medium can store management information (version information, creator name, etc.) for the programs stored in the storage medium and information relevant to the OS that reads the programs (e.g., icons discriminately displaying the programs).

Furthermore, a directory of the storage medium can manage data belonging to various programs. Moreover, the storage medium can store a program for installing various programs on a computer and a decompression program if the installed program is compressed.

A host computer can execute programs that are installed from an external device to realize the functions of the above-described exemplary embodiments illustrated in FIGS. 6, 8, 9, 10, and 12. The present invention is applicable when information including programs is supplied from a storage medium (such as, CD-ROM, flash memory, FD), or from an external storage medium via or a network, to an output device.

Furthermore, software program code for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable on a computer when the functions or processes of the exemplary embodiments can be realized by the computer.

In this case, the program code itself can realize the functions of the exemplary embodiments. The equivalents of programs can be used if they possess comparable functions. In this case, the type of program can be any one of object code, interpreter program, and OS script data. Furthermore, the present invention encompasses supplying program code to a computer with a storage (or recording) medium storing the program code. A storage medium supplying the program can be selected from any one of a floppy disk, a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses World Wide Web (WWW) servers or FTP servers that allow numerous users to download the program files so that the functions or processes of the present invention can be realized on their computers.

Enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on a computer can execute part or the whole of actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or the whole of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-229393 filed Sep. 4, 2007, which is hereby incorporated by reference herein in its entirety.

What is claimed is:

1. An image-forming apparatus comprising:

a reception unit configured to receive a start instruction and an end instruction entered by a service engineer who performs a maintenance work for the image-forming apparatus;

a first holding unit configured to store first counter information obtained by the image-forming apparatus in a case that the reception unit receives the start instruction;

a second holding unit configured to store second counter information obtained by the image-forming apparatus in a case that an operating state of the image-forming apparatus satisfies a first end condition;

a third holding unit configured to store third counter information obtained by the image-forming apparatus in a case that the reception unit receives the end instruction entered by the service engineer;

a generation unit configured to generate maintenance information based on the second counter information stored in the second holding unit if the operating state of the image-forming apparatus satisfies the first end condition and further satisfies a second end condition before the reception unit receives the end instruction from the service engineer; and a deletion unit configured to delete the second counter information stored in the second holding unit in a case that the reception unit receives the end instruction entered by the service engineer after the operating state of the image-forming apparatus satisfies the first end condition, wherein the generation unit generates maintenance information based on the third counter information stored in the third holding unit in a case that the reception unit receives the end instruction entered by the service engineer, and wherein the second end condition is satisfied in a case that, after a predetermined time has elapsed after the reception of the start instruction for the maintenance work, the service engineer enters a start instruction again for a maintenance work without entering the end instruction of the maintenance work.

2. The image-forming apparatus according to claim 1, wherein the first end condition is satisfied in a case that a predetermined time has elapsed after the start instruction for the maintenance work is entered by the service engineer.

3. The image-forming apparatus according to claim 1, wherein the maintenance information based on the second counter information is information including the second counter information or information including a difference between the second counter information and the first counter information.

4. The image-forming apparatus according to claim 1, further comprising a transmission unit configured to transmit the maintenance information generated by the generation unit to an external apparatus.

5. The image-forming apparatus according to claim 1, further comprising an output unit configured to notify a provisional end of the maintenance work for the image-forming apparatus in a case that the operating state of the image-forming apparatus satisfies the first end condition.

6. An information-processing method for an image-forming apparatus, the information-processing method comprising:

receiving a start instruction and an end instruction entered by a service engineer who performs a maintenance work for the image-forming apparatus;

storing first counter information obtained by the image-forming apparatus in a case that the start instruction is received;

storing second counter information obtained by the image-forming apparatus in a case that an operating state of the image-forming apparatus satisfies a first end condition;

storing third counter information obtained by the image-forming apparatus in a case that the reception unit receives the end instruction entered by the service engineer;

generating maintenance information based on the second counter information if the operating state of the image-forming apparatus satisfies the first end condition and further satisfies a second end condition before the end instruction is received from the service engineer; and deleting the second counter information stored in the second holding unit in a case that the reception unit receives the end instruction entered by the service engineer after the operating state of the image-forming apparatus satisfies the first end condition, wherein the generation unit generates maintenance information based on the third counter information stored in the third holding unit in a case that the reception unit receives the end instruction entered by the service engineer, and wherein the second end condition is satisfied in a case that, after a predetermined time has elapsed after the reception of the start instruction for the maintenance work, the service engineer enters a start instruction again for a maintenance work without entering the end instruction of the maintenance work.

7. The information-processing method according to claim 6, further comprising deleting the second counter information in a case that the end instruction is entered by the service engineer after the operating state of the image-forming apparatus satisfies the first end condition.

8. The information-processing method according to claim 6, wherein the first end condition is satisfied in a case that a predetermined time has elapsed after the start instruction for the maintenance work is entered by the service engineer.

9. The information-processing method according to claim 6, wherein the maintenance information based on the second counter information is information including the second counter information or information including a difference between the second counter information and the first counter information.

10. The information-processing method according to claim 6, further comprising transmitting the generated maintenance information to an external apparatus.

11. The information-processing method according to claim 6, further comprising notifying a provisional end of the maintenance work for the image-forming apparatus in a case that the operating state of the image-forming apparatus satisfies the first end condition.

12. An information-processing method for an image-forming apparatus, the information-processing method comprising:

receiving a start instruction and an end instruction entered by a service engineer who performs a maintenance work for the image-forming apparatus;

storing start time of the maintenance work in a case that the start instruction is received;

storing time information in a case that an operating state of the image-forming apparatus satisfies a first end condition;

storing third counter information obtained by the image-forming apparatus in a case that the reception unit receives the end instruction entered by the service engineer;

generating maintenance information based on the time information stored in a case that the first end condition is satisfied if the operating state of the image-forming apparatus satisfies the first end condition and further satisfies a second end condition before the end instruction is received from the service engineer; and deleting the second counter information stored in the second holding unit in a case that the reception unit receives the end instruction entered by the service engineer after the operating state of the image-forming apparatus satisfies the first end condition, wherein the generation unit generates maintenance information based on the third counter information stored in the third holding unit in a case that the reception unit receives the end instruction entered by the service engineer, and wherein the second end condition is satisfied in a case that, after a predetermined time has elapsed after the reception of the start instruction for the maintenance work, the service engineer enters a start instruction again for a maintenance work without entering the end instruction of the maintenance work.

13. A computer-readable storage medium storing a program for causing a computer to perform an information-processing method comprising:

receiving a start instruction and an end instruction entered by a service engineer who performs a maintenance work for the image-forming apparatus;

storing first counter information obtained by the image-forming apparatus in a case that the start instruction is received;

storing second counter information obtained by the image-forming apparatus in a case that an operating state of the image-forming apparatus satisfies a first end condition;

storing third counter information obtained by the image-forming apparatus in a case that the reception unit receives the end instruction entered by the service engineer;

generating maintenance information based on the second counter information if the operating state of the image-forming apparatus satisfies the first end condition and further satisfies a second end condition before the end instruction is received from the service engineer; and deleting the second counter information stored in the second holding unit in a case that the reception unit receives the end instruction entered by the service engineer after the operating state of the image-forming apparatus satisfies the first end condition, wherein the generation unit generates maintenance information based on the third counter information stored in the third holding unit in a case that the reception unit receives the end instruction entered by the service engineer, and wherein the second end condition is satisfied in a case that, after a predetermined time has elapsed after the reception of the start instruction for the maintenance work, the service engineer enters a start instruction again for a maintenance work without entering the end instruction of the maintenance work.

14. A computer-readable storage medium storing a program for causing a computer to perform the information-processing method comprising:

receiving a start instruction and an end instruction entered by a service engineer who performs a maintenance work for the image-forming apparatus;

storing start time of the maintenance work in a case that the start instruction is received;

storing time information in a case that an operating state of the image-forming apparatus satisfies a first end condition;

storing third counter information obtained by the image-forming apparatus in a case that the reception unit receives the end instruction entered by the service engineer;

generating maintenance information based on the time information stored in a case that the first end condition is satisfied if the operating state of the image-forming apparatus satisfies the first end condition and further satisfies a second end condition before the end instruction is received from the service engineer; and deleting the second counter information stored in the second holding unit in a case that the reception unit receives the end instruction entered by the service engineer after the operating state of the image-forming apparatus satisfies the first end condition, wherein the generation unit generates maintenance information based on the third counter information stored in the third holding unit in a case that the reception unit receives the end instruction entered by the service engineer, and wherein the second end condition is satisfied in a case that, after a predetermined time has elapsed after the reception of the start instruction for the maintenance work, the service engineer enters a start instruction again for a maintenance work without entering the end instruction of the maintenance work.

* * * * *